US011367314B2

(12) United States Patent
He et al.

(10) Patent No.: US 11,367,314 B2
(45) Date of Patent: Jun. 21, 2022

(54) ANTI-SPOOFING FACE ID SENSING BASED ON RETRO-REFLECTION

(71) Applicant: Shenzhen Goodix Technology Co., Ltd., Shenzhen (CN)

(72) Inventors: Yi He, San Diego, CA (US); Bo Pi, San Diego, CA (US)

(73) Assignee: Shenzhen Goodix Technology Co., Ltd., Shenzhen (CN)

( * ) Notice: Subject to any disclaimer, the term of this patent is extended or adjusted under 35 U.S.C. 154(b) by 727 days.

(21) Appl. No.: 16/361,206

(22) Filed: Mar. 22, 2019

(65) Prior Publication Data
US 2020/0226397 A1 Jul. 16, 2020

Related U.S. Application Data

(60) Provisional application No. 62/793,341, filed on Jan. 16, 2019.

(51) Int. Cl.
*G06V 40/40* (2022.01)
*G06F 21/32* (2013.01)
(Continued)

(52) U.S. Cl.
CPC .............. *G06V 40/45* (2022.01); *G06F 21/32* (2013.01); *G06V 10/147* (2022.01); *G06V 10/60* (2022.01);
(Continued)

(58) Field of Classification Search
CPC .... G06V 40/45; G06V 40/168; G06V 40/172; G06V 10/60; G06V 10/751;
(Continued)

(56) References Cited

U.S. PATENT DOCUMENTS 6,243,350 B1 6/2001 Knight et al.
6,320,177 B1 11/2001 Sayag
(Continued)

FOREIGN PATENT DOCUMENTS

CN 103902960 A 7/2014
CN 105138996 A 12/2015
(Continued)

OTHER PUBLICATIONS

International Search Report dated Jul. 25, 2019 in the corresponding PCT application (application No. PCT/CN2019/090038).
(Continued)

*Primary Examiner* — Techane Gergiso
(74) *Attorney, Agent, or Firm* — Kilpatrick Townsend & Stockton, LLP

(57) ABSTRACT

A security check system using face ID sensing for secure access to an electronic platform includes a light source, a camera disposed adjacent the light source and configured to form an image of the object while a light beam provided by the light source is incident on the object, a computer memory configured to store face ID data of an authorized person, and a processing module configured to analyze the image to extract facial signatures and to determine whether there exists an indication of a retro-reflection, compare the facial signatures to the face ID data to determine whether a match exists, in response to determining that the match exists and the indication of the retro-reflection exists, grant access to the electronic platform, and in response to determining that the match does not exist or the indication of the retro-reflection does not exist, deny access to the electronic platform.

20 Claims, 26 Drawing Sheets

(51) Int. Cl.
| | |
|---|---|
| *H04N 5/225* | (2006.01) |
| *G06V 10/60* | (2022.01) |
| *G06V 10/147* | (2022.01) |
| *G06V 10/75* | (2022.01) |
| *H04N 5/247* | (2006.01) |
| *G06V 40/50* | (2022.01) |
| *G06V 40/16* | (2022.01) |

(52) U.S. Cl.
CPC .......... *G06V 10/751* (2022.01); *G06V 40/168* (2022.01); *G06V 40/172* (2022.01); *G06V 40/50* (2022.01); *H04N 5/2254* (2013.01); *H04N 5/2256* (2013.01); *H04N 5/247* (2013.01); *G06F 2221/2117* (2013.01); *H04N 5/2253* (2013.01)

(58) Field of Classification Search
CPC ...... G06V 10/147; G06V 40/50; G06V 40/40; G06V 40/166; G06V 40/18; G06V 40/19; G06V 40/193; G06V 40/197; G06V 40/173; G06V 40/161; G06V 40/169; G06V 40/171; G06V 40/16; G06F 21/32; G06F 2221/2117; H04N 5/2254; H04N 5/2256; H04N 5/247; H04N 5/2253; H04N 5/225; H04N 5/23218; H04N 7/18; H04N 5/23219; G06K 9/00; G06K 9/62; H04L 63/0861; G06T 11/60; G06T 2207/30196; G06T 2207/30201; G06T 2207/10028; G07C 9/37; G01B 11/22
See application file for complete search history.

(56) References Cited

U.S. PATENT DOCUMENTS

| | | | |
|---|---|---|---|
| 8,125,698 | B2 | 2/2012 | Huang et al. |
| 8,411,909 | B1 | 4/2013 | Zhao et al. |
| 8,655,027 | B1 | 2/2014 | Olthoff |
| 8,886,953 | B1 | 11/2014 | Sipe et al. |
| 9,251,427 | B1* | 2/2016 | Chu ........................ G06V 10/42 |
| 9,934,504 | B2 | 4/2018 | Wang et al. |
| 2005/0008199 | A1 | 1/2005 | Dong et al. |
| 2006/0136743 | A1 | 6/2006 | Polcha et al. |
| 2007/0046804 | A1 | 3/2007 | Hirano et al. |
| 2009/0116030 | A1 | 5/2009 | Bahuguna |
| 2013/0250108 | A1 | 9/2013 | Du et al. |
| 2014/0065720 | A1 | 3/2014 | Ja |
| 2014/0337930 | A1* | 11/2014 | Hoyos ................. H04L 63/0861 726/4 |
| 2015/0260965 | A1 | 9/2015 | Inoue et al. |
| 2016/0012218 | A1 | 1/2016 | Perna et al. |
| 2016/0026884 | A1 | 1/2016 | Ferren |
| 2016/0062456 | A1 | 3/2016 | Wang et al. |
| 2016/0063235 | A1 | 3/2016 | Tussy et al. |
| 2016/0117544 | A1* | 4/2016 | Hoyos .................... G06V 40/19 348/78 |
| 2016/0140390 | A1* | 5/2016 | Ghosh ...................... H04N 5/33 348/78 |
| 2016/0140405 | A1 | 5/2016 | Graumann et al. |
| 2016/0308859 | A1* | 10/2016 | Barry ................... G06V 40/172 |
| 2016/0335483 | A1* | 11/2016 | Pfursich ................ G06V 10/40 |
| 2016/0343107 | A1 | 11/2016 | Newman et al. |
| 2017/0103276 | A1 | 4/2017 | Rauhala et al. |
| 2017/0180348 | A1* | 6/2017 | Piccolotto .............. G06V 40/45 |
| 2017/0236009 | A1 | 8/2017 | Zundel et al. |
| 2018/0005043 | A1 | 1/2018 | Boss et al. |
| 2018/0144185 | A1 | 5/2018 | Yoo et al. |
| 2018/0165501 | A1 | 6/2018 | Mathieu |
| 2018/0181737 | A1 | 6/2018 | Tussy |
| 2018/0349683 | A1 | 12/2018 | Mathieu |
| 2019/0130171 | A1* | 5/2019 | Alameh ............... G06V 10/143 |
| 2019/0147676 | A1* | 5/2019 | Madzhunkov .......... G06T 7/521 340/5.2 |
| 2019/0213312 | A1 | 7/2019 | Tussy et al. |
| 2020/0026941 | A1 | 1/2020 | Tan et al. |
| 2020/0097643 | A1 | 3/2020 | Uzun et al. |
| 2020/0218392 | A1 | 7/2020 | He et al. |
| 2020/0218886 | A1 | 7/2020 | Sheets et al. |
| 2020/0311238 | A1* | 10/2020 | Ackerman ............... G06F 21/32 |
| 2021/0049391 | A1* | 2/2021 | Zou ........................ G06V 40/45 |
| 2021/0082136 | A1 | 3/2021 | Nikitidis et al. |
| 2021/0397817 | A1 | 12/2021 | Su et al. |

FOREIGN PATENT DOCUMENTS

| | | |
|---|---|---|
| CN | 105740775 A | 7/2016 |
| CN | 107316346 A | 11/2017 |
| CN | 207665104 U | 7/2018 |
| CN | 108491768 A | 9/2018 |
| CN | 108495044 A | 9/2018 |
| CN | 108549867 A | 9/2018 |
| CN | 108573170 A | 9/2018 |
| CN | 108616688 A | 10/2018 |
| CN | 108650247 A | 10/2018 |
| CN | 108900748 A | 11/2018 |
| CN | 208110631 U | 11/2018 |
| CN | 109086718 A | 12/2018 |
| CN | 109154959 A | 1/2019 |
| CN | 109196524 A | 1/2019 |
| CN | 209560568 U | 10/2019 |
| CN | 111126146 A | 5/2020 |
| EP | 2680190 A2 | 1/2014 |
| WO | 2015020709 A2 | 2/2015 |
| WO | 2018210317 A1 | 11/2018 |

OTHER PUBLICATIONS

International Search Report dated Jul. 25, 2019 in the corresponding PCT application (application No. PCT/CN2019090040).

Siwei U ,"Smadphone biometric application research", Guangdong Communication Technology, vol. 2016, 38(06), total 6 pp., Jun. 16, 2018 z.

Mhou Kudzaishe et al.,"Face spoof detection using light refection in moderate to low lighting", 2017 2nd Asia-Pacific conference on Intelligent Robot Systems(ACIRS), IEEE, Jun. 16, 2017, pp. 47-52, XP033126331.

Joshua J Engelsma et al.,, "RaspiReader: An Open Source Fingerprint Reader Facilitating Spoof Detection", Arxiv.org, Cornell university Library, 2010 Lin Library Cornell University Ithaca, NY 14853, Aug. 25, 2017, total 14 pages, XP080954617.

Xu Zhang et al., "Face spoofing detection based on 3D lighting environment analysis of image pair", 2016 23rd International Conference on Pattern Recognition(ICPR), IEEE, Dec. 4, 2016, pp. 2995-3000, XP033086040.

Wen Di et al.: "Face Spoof Detection With Image Distortion Analysis", IEEE Transactions on Information Forensics and Security, IEEE, Piscataway, NJ, US, vol. 10, No. 4, Apr. 1, 2015, pp. 746-761.

Anonymous: "Distortion (optics)", Wikipedia, Sep. 11, 2017 (Sep. 11, 2017), pp. 1-5, XP055740342, Retrieved from the Internet: URL:https://en.wikipedia.org/w/index.php?title=Distortion_(optics) &oldid=800081708.

Edgar Matthew et al., "Where fewer pixels give you more image" 11 Proceedings of SPIE, SPIE, US, vol. 10546, Feb. 22, 2018, total 8 pages.

International Search Report dated Sep. 3, 2019 in the corresponding international application (application No. PCT/CN2019/090039).

Non-Final Office Action dated Mar. 4, 2022 in the related U.S. Appl. No. 16/361,197.

Non-Final Office Action dated Mar. 18, 2022 in the related U.S. Appl. No. 16/361,203.

* cited by examiner

ANTI-SPOOFING FACE ID SENSING BASED ON RETRO-REFLECTION

CROSS-REFERENCES TO RELATED APPLICATIONS

This application claims the benefit of U.S. Provisional Patent Application No. 62/793,341, filed on Jan. 16, 2019, the content of which is incorporated by reference in its entirety.

The following three U.S. Patent Applications (including this one) are being filed concurrently, and the entire disclosure of the other application is incorporated by reference into this application for all purposes:

Application Ser. No. 16/361,197, filed Mar. 21, 2019, entitled "ANTI-SPOOFING FACE ID SENSING,"

Application Ser. No. 16/361,203, filed Mar. 22, 2019, entitled "ANTI-SPOOFING FACE ID SENSING USING TWO CAMERAS," and Application Ser. No. 16/361,206, filed Mar. 22, 2019, entitled "ANTI-SPOOFING FACE ID SENSING BASED ON RETRO-REFLECTION."

TECHNICAL FIELD

This disclosure relates to face identification (ID) sensing with anti-spoofing capabilities for secure access to in electronic platforms, including portable computing devices such as mobile devices, wearable devices, electronic payment systems, and larger systems.

BACKGROUND

Electronic devices, such as smart phones, tablets, and laptops, may be equipped with security access systems, such as face identification (ID), fingerprint sensors, and the like. For example, face ID may be used to unlock a smart phone, log in to apps and accounts, or even for mobile payments. There exists a risk that such security access systems may be spoofed by using a photograph or a video of a person, or using a statue of a person. Therefore, there is a need for face ID sensors that have anti-spoofing capabilities.

SUMMARY

According to some embodiments, a security check system using face ID sensing for secure access to an electronic platform includes a camera. The camera includes an imaging lens configured to form a modulated image of an object positioned in front of the camera. The modulated image of the object includes deviations from an ideal image. The security check system further includes a computer memory configured to store face ID data of an authorized person. The face ID data is generated from one or more modulated images of a live face of the authorized person acquired by the camera during a registration process. The security check system further includes a processing module coupled to the camera and the computer memory. The processing module is configured to analyze the modulated image of the object to extract facial signatures, compare the facial signatures to the face ID data, and determine whether the object is the live face of the authorized person based on the comparison.

According to some embodiments, a face ID sensor includes an imaging lens configured to form a modulated image of an object. The imaging lens includes a transparent slab having a first surface facing the object, and a second surface opposite to the first surface. The imaging lens further includes a half-ball lens attached to the second surface of the transparent slab. The face ID sensor further includes a photodetector positioned substantially at a focal plane of the imaging lens, and configured to convert optical signals of the modulated image into electrical signals.

According to some embodiments, a method of security check using face ID sensing for secure access to an electronic platform is provided. The method is performed by a security check system that includes a camera, a computer memory, and a processing module. The method includes storing face ID data of an authorized person in the computer memory. The face ID data is generated from one or more images of a live face of the authorized person acquired by the camera during a registration process. The camera includes an imaging lens configured to form modulated images. The method further includes acquiring, using the camera, a modulated image of a first object positioned in front of the camera, analyzing, using the processing module, the modulated image of the first object to extract facial signatures, comparing, using the processing module, the facial signatures to the face ID data, and determining, using the processing module, whether the first object is the live face of the authorized person based on the comparison.

According to some embodiments, a security check system using face ID sensing for secure access to an electronic platform includes a first camera configured to form a near ideal image of an object, and a second camera that includes an imaging lens configured to form a modulated image of the object. The modulated image of the object includes deviations from the ideal image of the object. The security check system further includes a computer memory configured to store face ID data of an authorized person. The face ID data is generated from one or more near ideal images of a live face of the authorized person acquired by the first camera during a registration process, and one or more modulated images of the live face of the authorized person acquired by the second camera during the registration process. The security check system further includes a processing module coupled to the first camera, the second camera, and the computer memory. The processing module is configured to analyze the near ideal image of the object to extract a first set of facial signatures, analyze the modulated image of the object to extract a second set of facial signatures, compare the first set of facial signatures and the second set of facial signatures to the face ID data, and determine whether the object is the live face of the authorized person based on the comparison.

According to some embodiments, a method of security check using face ID sensing for secure access to an electronic platform is provided. The method is performed by a security check system that includes a first camera, a second camera, a computer memory, and a processing module. The method includes storing face ID data of an authorized person in the computer memory. The face ID data is generated from one or more near ideal images of a live face of the authorized person acquired by the first camera during a registration process, and one or more modulated images of the live face of the authorized person acquired by the second camera during the registration process. Each of the one or more modulated images corresponds to a respective one of the one or more near ideal images. The second camera includes an imaging lens configured so that a respective modulated image deviates from a corresponding near ideal image. The method further includes acquiring, using the first camera, a near ideal image of an object, acquiring, using the second camera, a modulated image of the object simultaneously with acquiring of the near ideal image, analyzing, using the processing module, the near ideal image of the object to extract a first set of facial signatures, analyzing, using the processing module, the modulated image of the object to extract a second set of facial signatures, comparing, using the processing module, the first set of facial signatures and the second set of facial signatures to the face ID data, and determining, using the processing module, whether the object is the live face of the authorized person based on the comparison.

According to some embodiments, a method of security check using face ID sensing for secure access to an electronic platform is provided. The method is performed by a security check system that includes a first camera, a second camera, a computer memory, and a processing module. The method includes storing face ID data of an authorized person in the computer memory. The face ID data is generated from one or more near ideal images of a live face of the authorized person acquired by the first camera during a registration process. The method further includes acquiring, using the first camera, a near ideal image of an object, analyzing, using the processing module, the near ideal image of the object to extract a first set of facial signatures, and determining, using the processing module, whether the first set of facial signatures matches with the face ID data by comparing the first set of facial signatures to the face ID data. The method further includes, in response to determining that the first set of facial signatures does not match with the face ID data, denying access to the electronic platform. The method further includes, in response to determining that the first set of facial signatures matches with the face ID data, digitally modulating, using the processing module, the near ideal image of the object to obtain a first modulated image of the object using the processing module, and acquiring, using the second camera, a second modulated image of the object. The second camera includes an imaging lens configured so that the second modulated image of the object deviates from the near ideal image of the object. The method further includes comparing, using the processing module, the first modulated image of the object and the second modulated image of the object, and determining, using the processing module, whether the object is the live face of the authorized person based on the comparison.

According to some embodiments, a security check system using face ID sensing for secure access to an electronic platform includes a light source configured to provide a light beam to be incident on an object, a camera disposed adjacent the light source and configured to form an image of the object while the light beam is incident on the object, and a computer memory configured to store face ID data of an authorized person. The face ID data is generated from one or more images of a face of the authorized person acquired by the camera during a registration process. The security check system further includes a processing module coupled to the camera and the computer memory, and configured to analyze the image of the object to extract facial signatures and to determine whether there exists an indication of a retro-reflection of the light beam incident on the object, and compare the facial signatures to the face ID data to determine whether a match exists between the facial signatures and the face ID data. The processing module is further configured to, in response to determining that the match exists between the facial signatures and the face ID data and the indication of the retro-reflection exists, grant access to the electronic platform, and in response to determining that the match does not exist between the facial signatures and the face ID data or the indication of the retro-reflection does not exist, deny access to the electronic platform.

According to some embodiments, a security check system using face ID sensing for secure access to an electronic platform includes a light source attached to a frame of the electronic platform and configured to provide an incident light beam to be incident on an object, and a first camera attached to the frame of the electronic platform and configured to form a first image of the object while the incident light beam is incident on the object. The first camera is positioned adjacent the light source such that a retro-reflected light beam caused by the incident light beam is within a field of view (FOV) of the first camera. The security check system further includes a second camera attached to the frame of the electronic platform and configured to form a second image of the object while the incident light beam is incident on the object. The second camera is spaced apart from the light source such that the retro-reflected light beam is outside a FOV of the second camera. The security check system further includes a computer memory configured to store face ID data of an authorized person. The face ID data is generated from at least one of one or more first images of a live face of the authorized person acquired by the first camera during a registration process, or one or more second images of the live face of the authorized person acquired by the second camera during the registration process. The security check system further includes a processing module coupled to the first camera, the second camera, and the computer memory, and configured to analyze at least one of the first image of the object or the second image of the object to extract facial signatures, compare the facial signatures to the face ID data to determine whether a match exists, compare the first image of the object to the second image of the object to determine whether there exists an indication of the retro-reflected light beam in the first image of the object, in response to determining that the match exists between the facial signatures and the face ID data and the indication of the retro-reflected light beam, grant access to the electronic platform, and in response to determining that the match does not exist between the facial signatures and the face ID data or the indication of the retro-reflected light beam does not exist, deny access to the electronic platform.

According to some embodiments, a method of security check using face ID sensing for secure access to an electronic platform is provided. The method is performed by a security check system that includes a light source, a camera disposed adjacent the light source, a computer memory, and a processing module. The method includes storing face ID data of an authorized person in the computer memory. The face ID data is generated from one or more images of a live face of the authorized person acquired by the camera during a registration process. The method further includes shining a light beam produced by the light source on an object, acquiring, using the camera, an image of the object while the light beam shines on the object, analyzing, using the processing module, the image of the object to extract facial signatures and to determine whether there exists an indication of a retro-reflection of the light beam incident on the object, and comparing, using the processing module, the facial signatures to the face ID data to determine whether a match exists. The method further includes, in response to determining that the match does not exist between the facial signatures and the face ID data or the indication of the retro-reflection does not exist, denying access to the electronic platform, and in response to determining that the match exists between the facial signatures and the face ID data, and the indication of the retro-reflection exists, granting access to the electronic platform.

DETAILED DESCRIPTION

Figure 1:
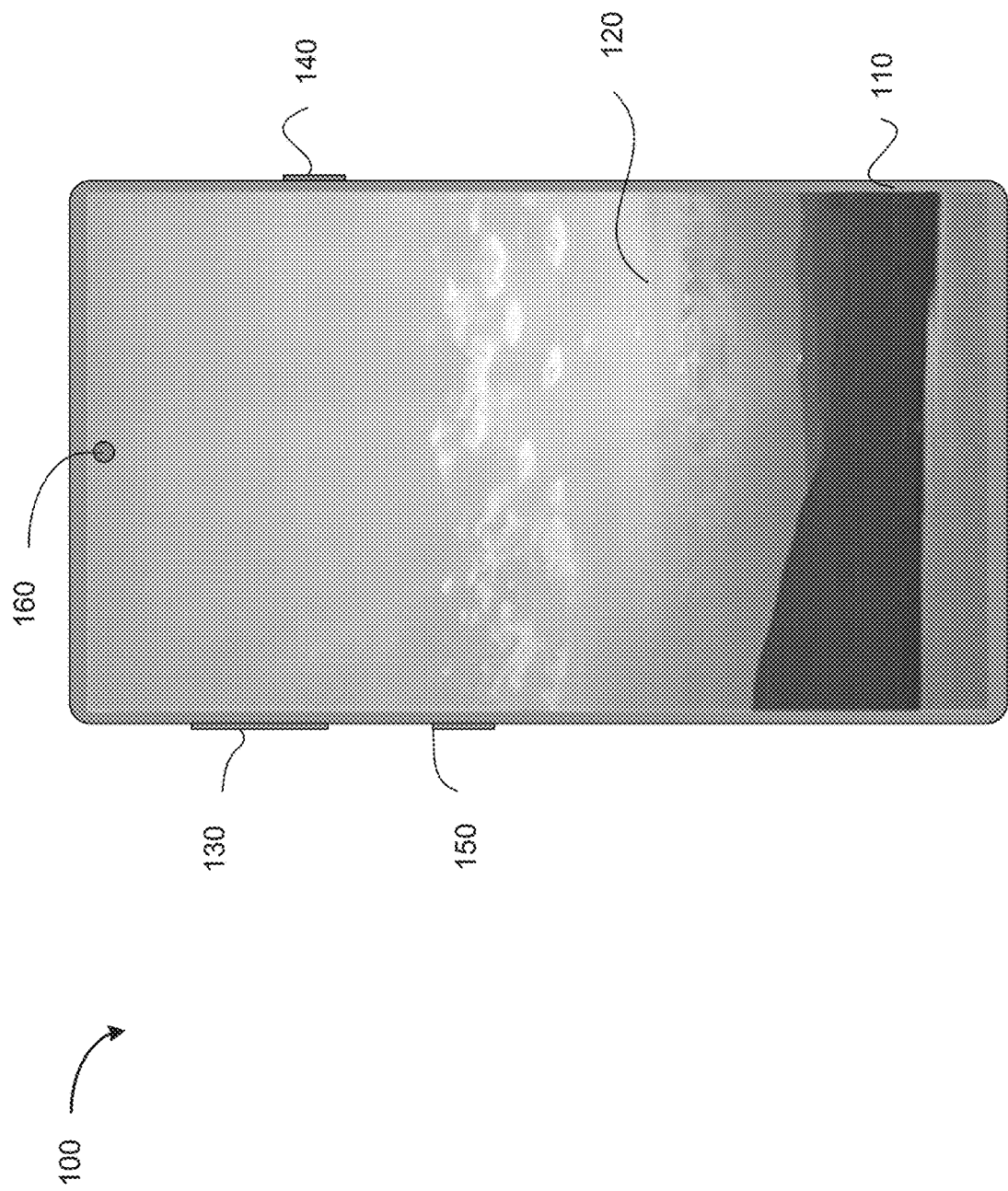
FIG. 1 illustrates a mobile device that includes a front camera according to some embodiments.

FIG. 1 illustrates a mobile device 100, which can be a smart phone, a tablet, a laptop, or the like, according to some embodiments. The mobile device 100 may include a display screen 120, and a frame 110 surrounding the display screen 120. The mobile device 100 may also include control buttons such as a power button 140 and one or more audio volume control buttons 130, and a holding force sensor 150. The mobile device 100 may include a front camera 160. For example, the front camera 160 may be used for taking selfies. The front camera 160 may also be used for face ID sensing.

Figure 2:
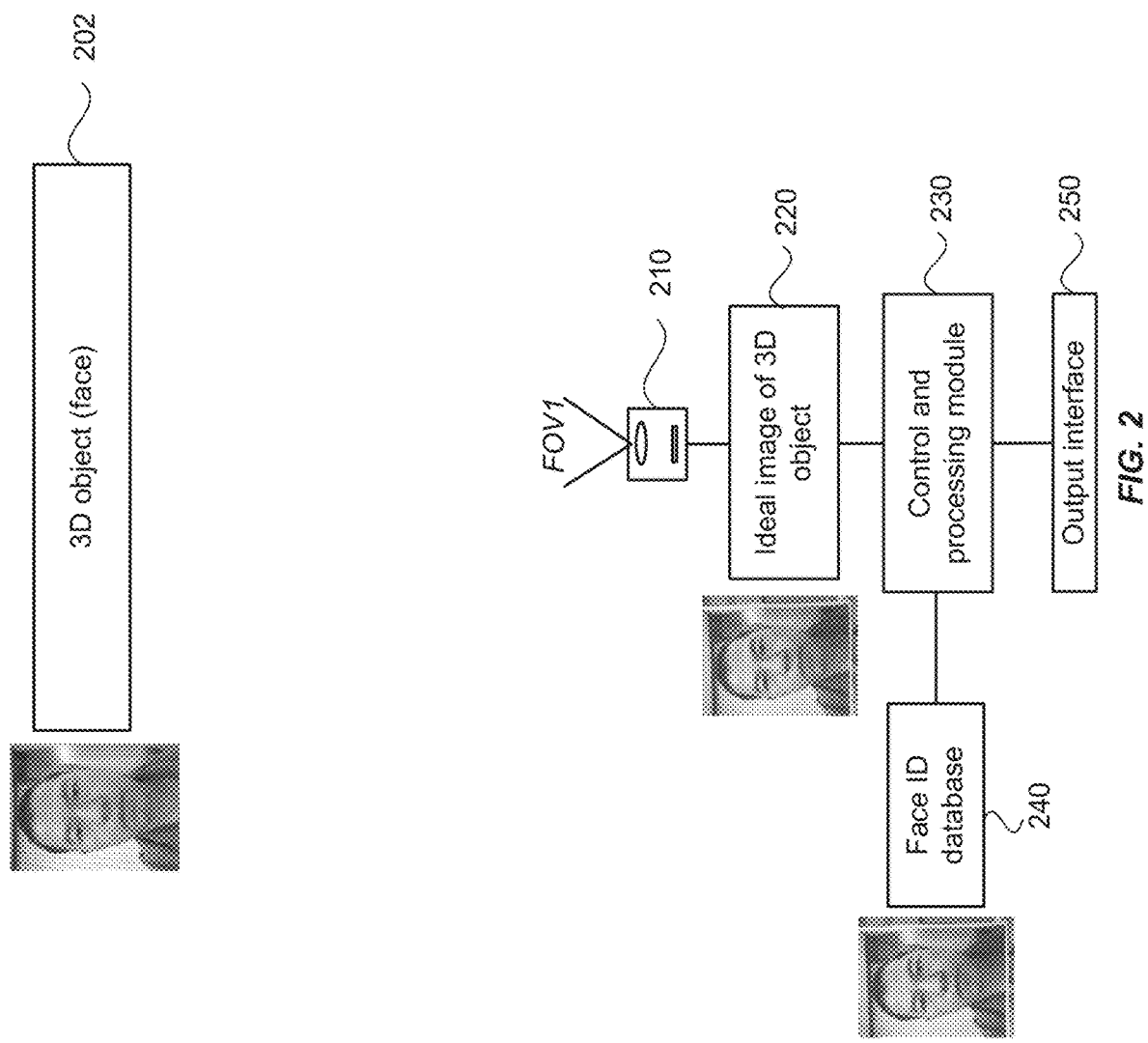
FIG. 2 illustrates schematically a security check system using face ID sensing according to some embodiments.

FIG. 2 illustrates schematically a security check system using face ID sensing according to some embodiments. For example, the front camera 210 may be located at a front side of the mobile device 100, similar to the front camera 160 illustrated in FIG. 1. The front camera 210 may have a certain field of view (FOV) FOV1 for capturing an image of a three-dimensional (3D) object 202, such as a human face, positioned within the FOV1. The front camera 210 may be designed to form a nearly ideal image 220 of the 3D object 202. An ideal image 220 may have no or very small distortions or other types of image aberrations (e.g., spherical aberration, coma, astigmatism, and field curvature).

A control and processing module 230 may analyze the characteristics of the image 220 of the 3D object 202. For example, the control and processing module 230 may be configured to identify that the image 220 contains an image of a human face and extract facial signatures of the human face from the image 220. The control and processing module 230 may be further configured to compare the facial signatures in the image 220 with facial signatures of an authorized user stored in a face ID database 240. The face ID database may include face ID data of the authorized user generated during a registration process. For example, during the registration process, one or more images of the live face of the authorized user may be captured by the front camera 210. The images may be analyzed to extract the facial signatures of the authorized user. The facial images of the authorized user, as well as the facial signatures, may be stored in the face ID database 240 for subsequent security check.

The control and processing module 230 may determine whether the facial signatures in the ideal image 220 matches with a face ID data stored in the face ID database 240. The control and processing module 230 may output a facial recognition decision via an output interface 250.

A processing unit of the mobile device 100 may grant or deny access based on the facial recognition decision. For example, if the control and processing module 230 outputs a positive facial recognition decision indicating a match, the processing unit of the mobile device 100 may grant access to the mobile device 100 (e.g., waking up the mobile device 100). On the other hand, if the control and processing module 230 outputs a negative facial recognition decision indicating a non-match, the processing unit of the mobile device 100 may deny access to the mobile device 100 (e.g., the mobile device 100 may remain locked).

Figure 3:
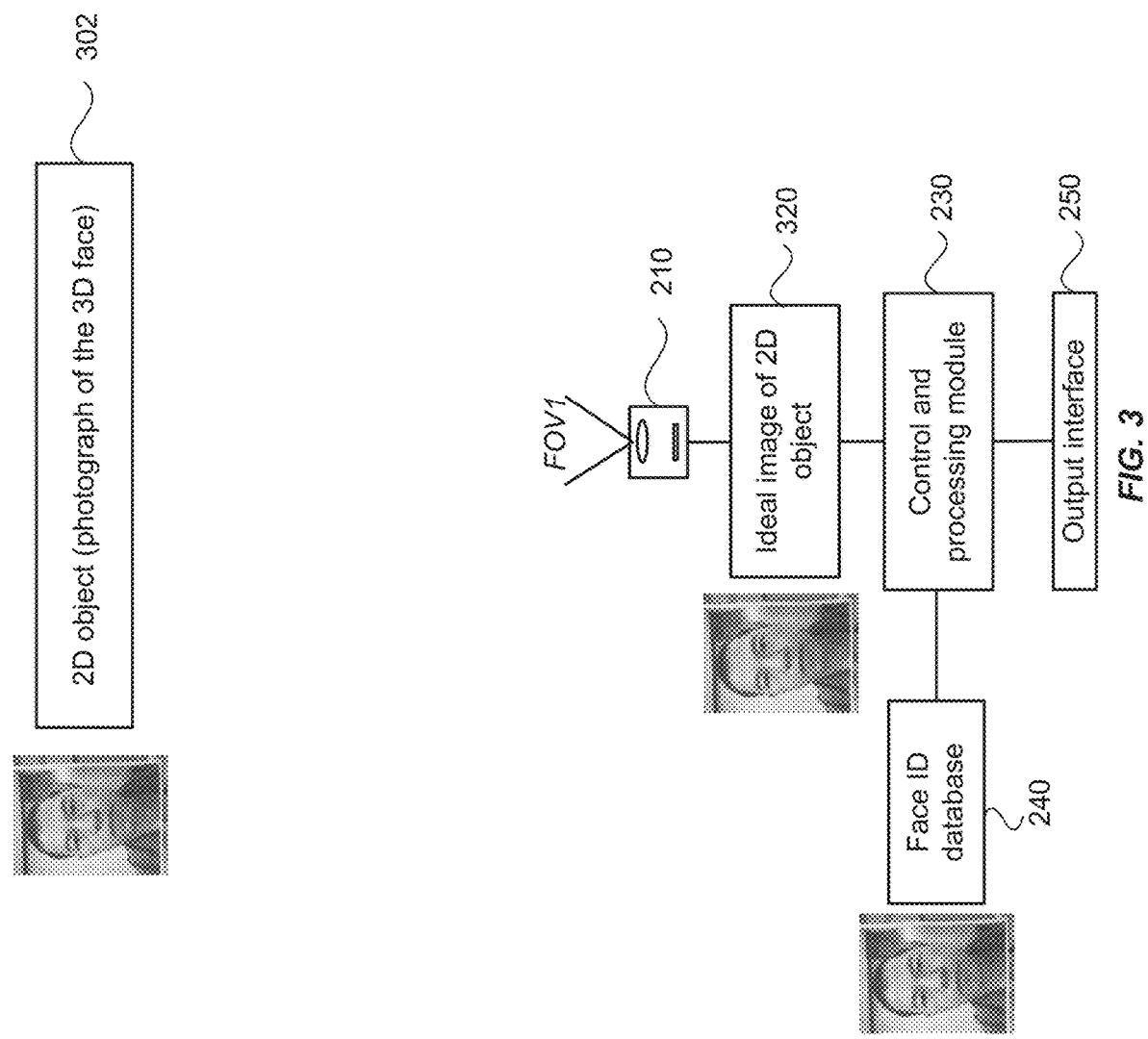
FIG. 3 illustrates an example in which a two-dimensional (2D) photograph is used to spoof the security check system illustrated in FIG. 2.

The system illustrated in FIG. 2 may be vulnerable to spoofing attacks using fake materials carrying the same bio signatures as those of the authorized user. For example, the system may be fooled by a photograph or a video of the authorized user. FIG. 3 illustrates an example in which a two-dimensional (2D) photograph 302 is placed in front of the camera 210 instead of the live face 202. The camera 210 may form an ideal image 320 of the 2D photograph 302. The ideal image 320 may contain the same facial signatures as those of an ideal image 220 of the 3D face 202. Thus, the control and processing module 230 may not be able to tell the difference between a live face 202 and a photograph 302 of the face 202.

I. Anti-Spoofing Face ID Sensing Based on Image Modulations

Figure 4:
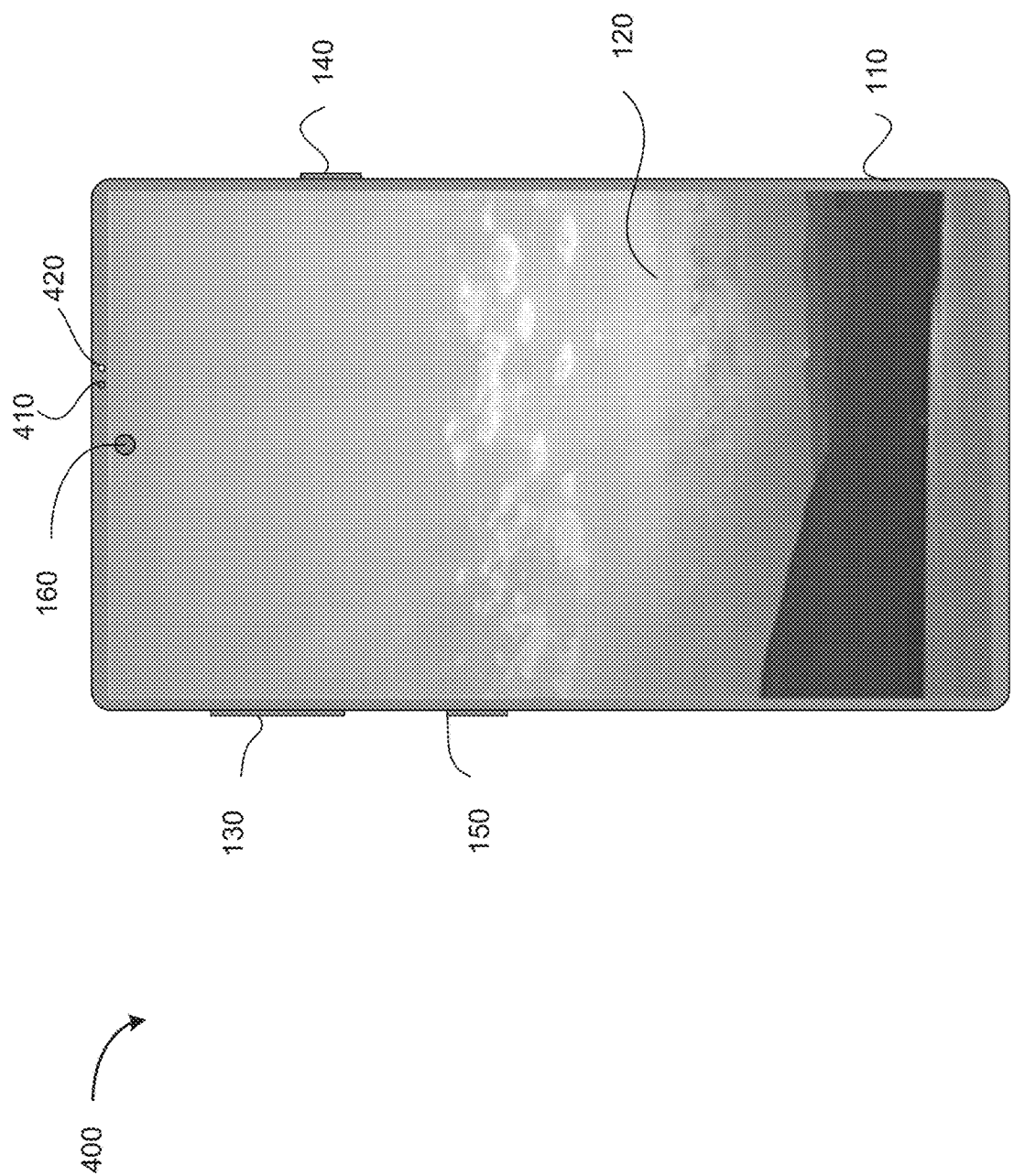
FIG. 4 illustrates a mobile device equipped with an anti-spoofing face ID sensor for a security check system according to some embodiments.

According to some embodiments, a face ID sensor is configured to have spoofing detection capabilities by introducing image modulations. FIG. 4 illustrates a mobile device 400 equipped with an anti-spoofing face ID sensor according to some embodiments. In addition to the front camera 160, the mobile device 400 may include a second camera 410 as part of the anti-spoofing face ID sensor. The second camera 410 may be packaged with a small opening window that can be integrated into the frame 110 of the display screen 120. In some embodiments, the second camera 410 may replace the front camera 160.

The mobile device 400 may also include an optional illumination light source 420 positioned in close proximity to the second camera 410. The illumination light source 420 may provide illumination in a dark environment, thus enabling face ID sensing even when it is dark. The illumination light source 420 may be configured to emit infrared light (e.g., at about 940 nm wavelength) that is eye-safe. The illumination light source 420 may also be used for producing a retro-reflection of a user's eye, which can be combined with image modulations to detect spoofing, as described in more detail below.

Figure 5:
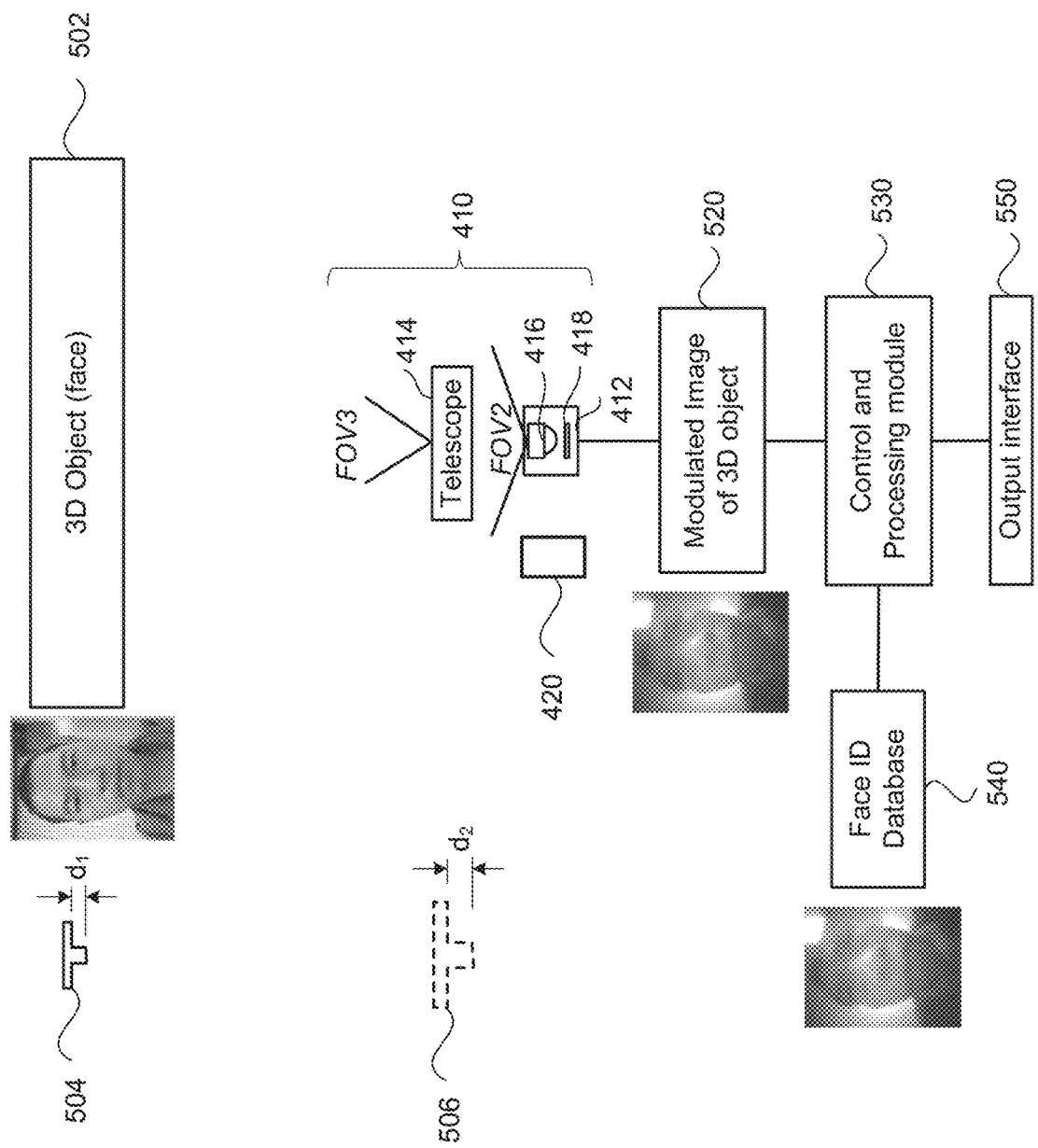
FIG. 5 illustrates schematically a security check system using anti-spoofing face ID sensing according to some embodiments.

FIG. 5 illustrates schematically a security check system using anti-spoofing face ID sensing according to some embodiments. The face ID sensor 410 may include a camera 412. The camera 412 may include an imaging lens 416 and a photodetector 418 positioned substantially at a focal plane of the imaging lens 416. The imaging lens 416 may form an image of an object at the surface of the photodetector 418. The photodetector 418 is configured to convert optical signals of the image into electrical signals. The photodetector 418 may include, for example, a photodiode array, a charged coupled device (CCD), a complementary metal oxide semiconductor (CMOS) sensor, or the like.

The imaging lens 416 may have a field of view FOV2. In some embodiments, FOV2 may be wider than the FOV of a normal camera (e.g., FOV1 of the front camera 210 illustrated in FIG. 2). In some embodiments, the face ID sensor 410 may include FOV converter optics 414 positioned in front of the camera 412. The FOV converter optics 414 may be configured so that the combination of the camera 412 and the FOV converter optics 414 has a field of view FOV3 that is narrower than FOV2. In some embodiments, FOV3 may be comparable to the FOV of a normal camera (e.g., FOV1 of the front camera 210 illustrated in FIG. 2). The FOV converter optics 414 may include, for example, a telescope.

The imaging lens 416 of the camera 412 may be configured to form a modulated image 520 of a 3D object 502 (e.g., a face) placed within the FOV (e.g., FOV3) of the face ID sensor 410. The modulated image 520 may include relatively large distortions or other types of image aberrations, referred herein as image modulations. The image modulations may be sensitive to the depth variations of the 3D object 502, and thus may provide depth information for distinguishing a 2D photograph from a 3D object. Therefore, the face ID sensor 410 may enable detection of spoofing attempts using a photograph or a video of a person's face. The camera 412 that is configured to produce relative large image modulations may be referred herein as a depth-aware camera.

In image formation, distortion is a form of image aberration that causes deviation from rectilinear projection, i.e., a projection in which straight lines in a scene remain straight in an image. Common forms of distortion include barrel distortion and pincushion distortion. In a barrel distortion, image magnification decreases with distance from the optical axis. The apparent effect is that of an image which has been mapped around a sphere (or barrel). In a pincushion distortion, image magnification increases with the distance from the optical axis. The apparent effect is that lines that do not go through the center of the image are bowed inwards, towards the center of the image, like a pincushion. Some images may exhibit a mixture of barrel distortion and pincushion distortion.

Figure 6C:
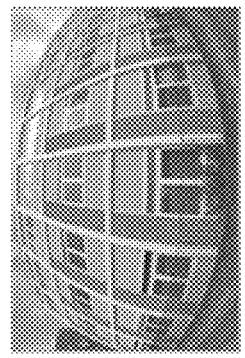
FIGS. 6A-6C illustrate some exemplary effects of image distortions according to some embodiments.
Figure 6B:
Figure 6A:
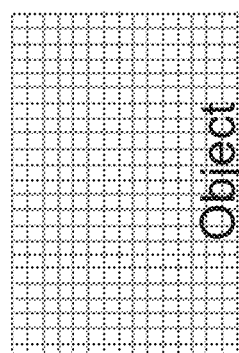

FIGS. 6A-6C illustrate some exemplary effects of image distortions. FIG. 6A shows an object with straight grid lines. FIG. 6B shows an image of the object shown in FIG. 6A, in which the grid lines deviate from straight lines. In this example, the distortion is predominantly barrel type. FIG. 6C shows an image of a building that exhibits severe distortion (e.g., barrel distortion).

Figure 7:
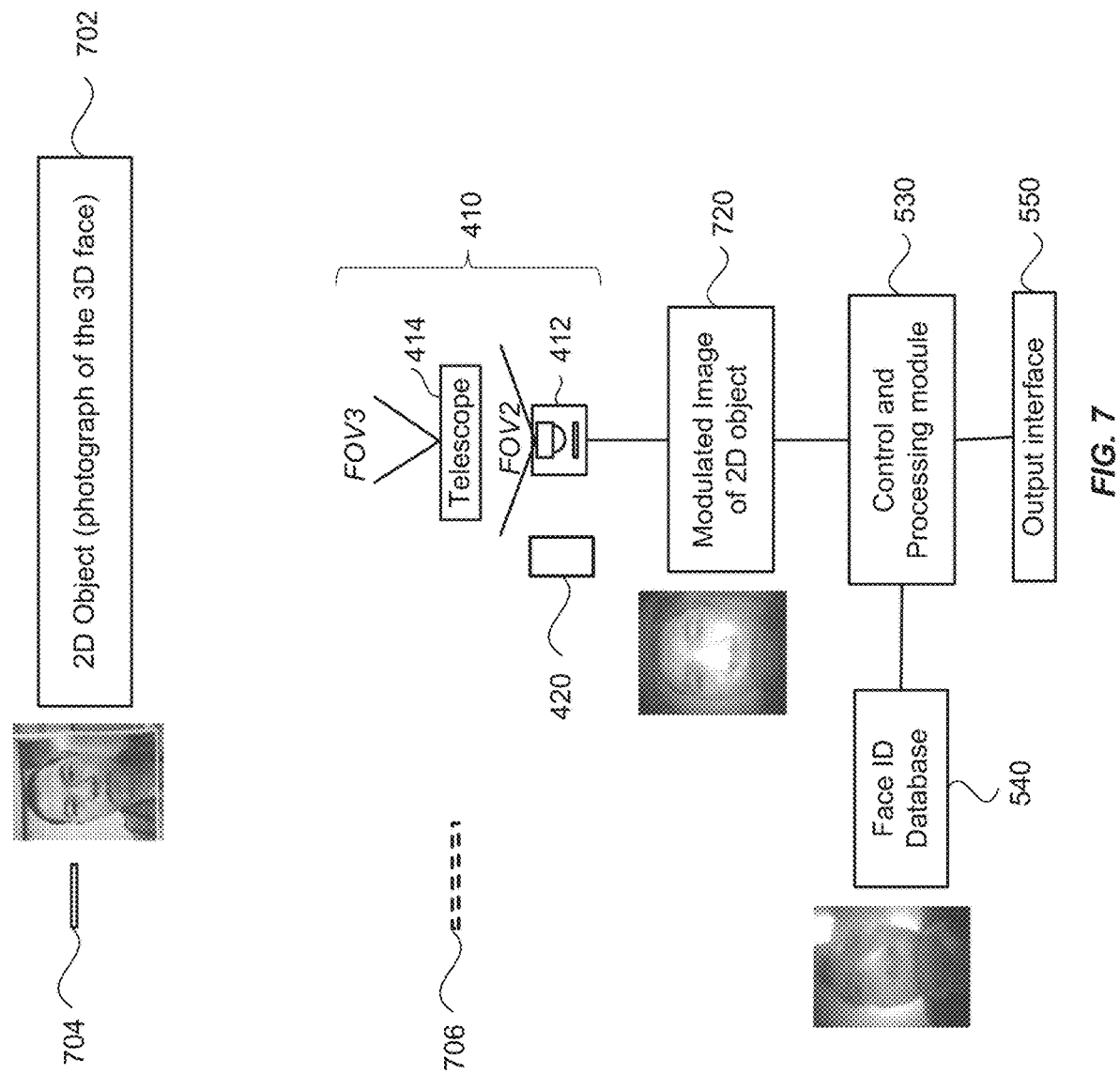
FIG. 7 illustrates an example in which a 2D photograph is used to spoof the security check system illustrated in FIG. 5.

Modulations in an image may be sensitive to the depth variations of an object. For example, the amount and characteristics of distortion may depend on the depth variations of the object. FIG. 7 illustrates an example in which a 2D photograph 702 of a face 502, instead of the 3D face 502, is placed in front of the depth-aware camera 412. The depth-aware camera 412 may form a modulated image 720 of the 2D photograph 702.

Figure 8C:
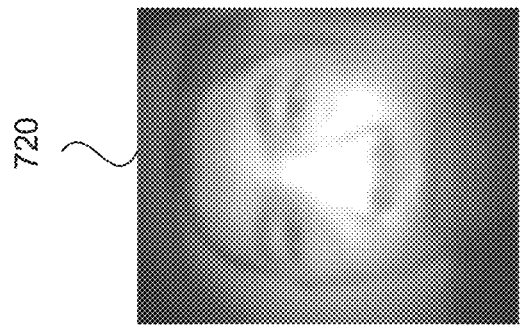
FIGS. 8A-8C shows a nearly ideal image of a 3D face, a modulated image of the 3D face, and a modulated image of a 2D photograph including the nearly ideal image of the 3D face, respectively, according to some embodiments.
Figure 8B:
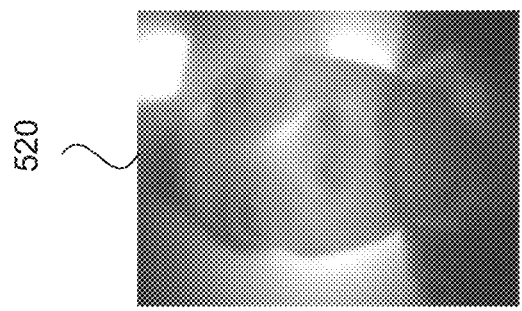
Figure 8A:
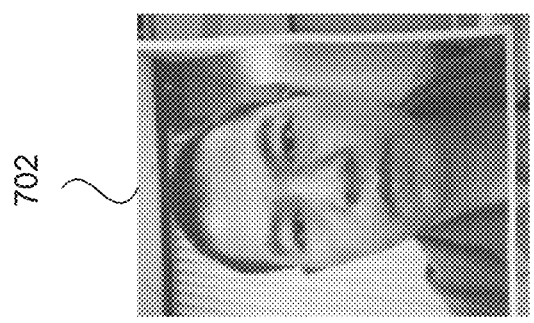

FIGS. 8A-8C illustrate the differences between the modulated image 520 of the 3D face 502 and the modulated image 720 of the 2D photograph 702. FIG. 8A shows the 2D photograph 702, which is an ideal image of the 3D face 502 acquired by a normal camera (e.g., the camera 210 illustrated in FIG. 2). As illustrated, the ideal image exhibits no or very small distortions. FIG. 8B shows the modulated image 520 of the 3D face 502 acquired by the depth-aware camera 412 illustrated in FIG. 5. As illustrated, the modulated image 520 exhibits rather large distortions. FIG. 8C shows the modulated image 720 of the 2D photograph 702 acquired using the depth-aware camera 412, as illustrated in FIG. 7. As illustrated, the modulated image 720 also exhibits rather large distortions.

Comparing FIG. 8B and FIG. 8C, it can be seen that the characteristics of the distortions in the modulated image 520 of the 3D face and the characteristics of the distortions in the modulated image 720 of the 2D photograph are quite different. For example, the modulated image 520 of the 3D face shown in FIG. 8B has more barrel distortions and the face appears elongated in the vertical direction, whereas the modulated image 720 of the 2D photograph shown in FIG. 8C has less barrel distortions and the face appears widened in the horizontal direction. Thus, the modulations in a modulated image acquired by the depth-aware camera 412 may carry depth information of the object being imaged. The depth information may be used to detect an attempt to fool the face ID sensor 410 using a photograph or a video according some embodiments.

Referring again to FIG. 5, a control and processing module 530 may extract facial signatures from the modulated image 520, and compare the facial signatures to the face ID data stored in a face ID database 540. The face ID data may be generated from images of a live face of an authorized user acquired by the depth-aware camera 412 during a registration process. Thus, if the object 502 is the live face of the authorized user, the modulated image 520 may exhibit similar modulations as in the face ID data stored in the face ID database 540. By comparing the facial signatures of the modulated image 520 to the face ID data, the control and processing module 530 may determine whether the facial signatures of the modulated image 520 match with the face ID data stored in the face ID database 540.

The control and processing module 530 may output a facial recognition decision via an output interface 550. A processing unit of the mobile device 400 may grant or deny access based on the facial recognition decision. For example, if the control and processing module 530 outputs a positive facial recognition decision indicating a match, the processing unit of the mobile device 400 may grant access to the mobile device 400 (e.g., waking up the mobile device 400). On the other hand, if the control and processing module 530 outputs a negative facial recognition decision indicating a non-match, the processing unit of the mobile device 400 may deny access to the mobile device 400 (e.g., the mobile device 400 may remain locked).

In the example illustrated in FIG. 5, if the modulated image 520 is an image of the 3D face 502, the control and processing module 530 may determine that the facial signatures in the modulated image 520 matches with the face ID data stored in the face ID database. Accordingly, access may be granted. In comparison, in the example illustrated in FIG. 7, if the modulated image 720 is an image of the 2D photograph 702, which exhibits different distortion characteristics from those of the modulated image 520 of the 3D face 502, the control and processing module 530 may determine that the facial signatures in the modulated image 720 does not match the face ID data stored in the face ID database. Accordingly, access may be denied.

Referring to FIG. 5, to illustrate the effect of the FOV converter optics 414 (e.g., a telescope) on the depth of an object, a schematic 3D object 504 with a depth $d_1$ is shown. The image 506 after the FOV converter optics 414 may retain or even enlarge the depth to $d_2$. In comparison, as illustrated in FIG. 7, an image 706 of a 2D object 704 after the FOV converter optics 414 is still planar and has no depth. Thus, the face ID sensor 410 that includes the FOV converter optics 414 may have enhanced sensitivity to the depth variations of an object being imaged.

Figure 9:
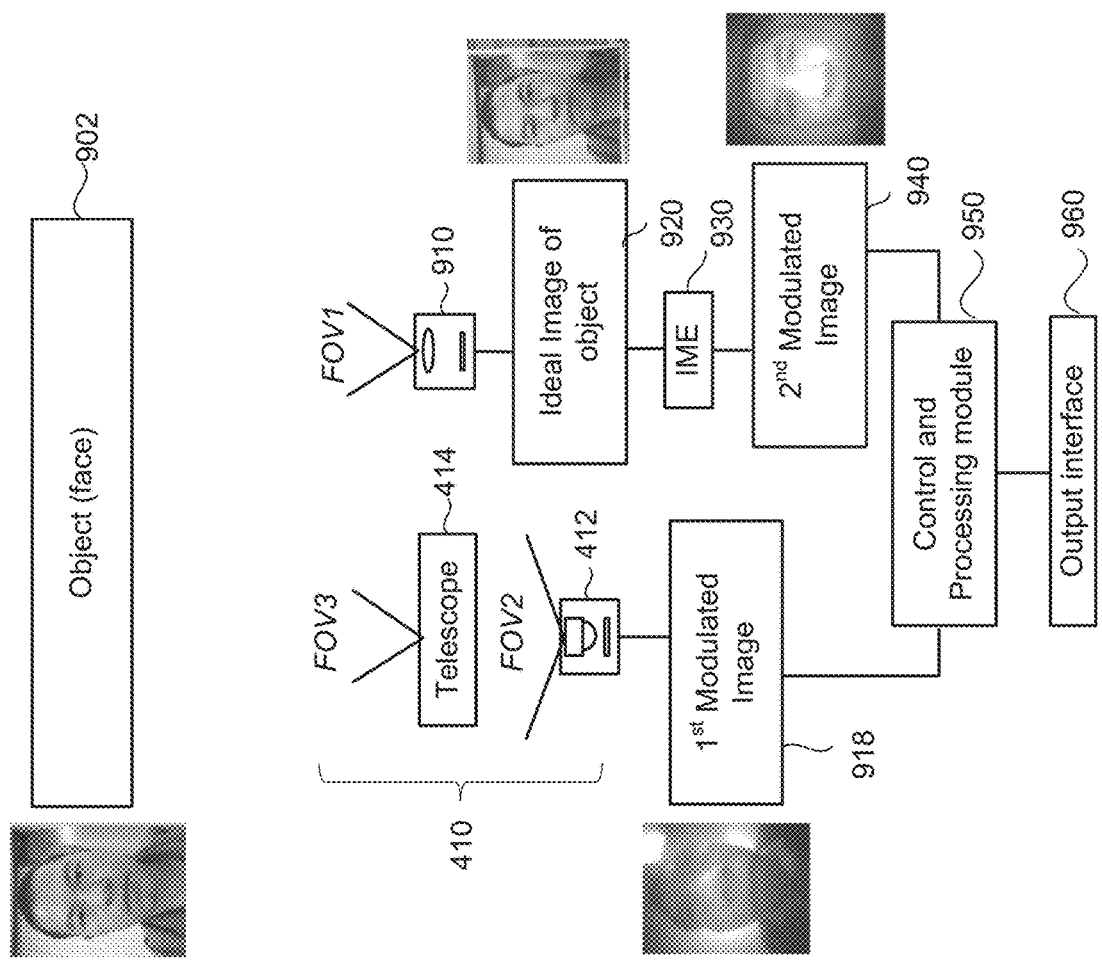
FIG. 9 illustrates schematically a security check system using anti-spoofing face ID sensing according to some embodiments.

FIG. 9 illustrates schematically a security check system using anti-spoofing face ID sensing according to some embodiments. The security check system may include a depth-aware camera 412 and a normal camera 910. The normal camera 910 may be the front camera 160 of a mobile device 400 illustrated in FIG. 4. The security check system may include two detection branches. Shown on the left side of FIG. 9 is a first detection branch that uses the depth-aware camera 412 configured to produce a first modulated image 918 of an object 902, as described above with reference to FIG. 5.

Shown on the right side of FIG. 9 is a second detection branch that uses the normal camera 910. The normal camera 910 may have a field of view FOV1. The normal camera 910 may be configured to form a nearly ideal image 920 of the object 902. For example, the normal camera 910 may be designed to form images with very small distortions and other types of image aberrations. In some embodiments, a FOV converter optics 414 is positioned in front of the depth-aware camera 410, so that the combination of the depth-aware camera 412 and the FOV converter optics 414 may have a field of view FOV3 that is comparable to FOV1 of the normal camera 910. Thus, the two detection branches may have approximately the same field of view.

The second detection branch may include an image modulation equalizer (IME) 930. The IME 930 is configured to add a modulation format to the ideal image 920 of the object 902 to obtain a second modulated image 940. In some embodiments, the modulation format may simulate the optical phases produced by the optical elements of the depth-aware camera 412 that cause the image modulations. Thus, the second modulated image 940 obtained by the IME 930 may be equivalent to a modulated image that would have been captured by the depth-aware camera 412 if the ideal image 920 is placed at the same position as that of the object 902 (e.g., like the 2D object 702 illustrated in FIG. 7). Thus, in effect, the IME 930 digitally modulates the ideal image 920 of the object 902. In some embodiments, the depth-aware camera 412 may have a set of distortion parameters, and adding the modulation format may include applying the set of distortion parameters to the ideal image 920.

Referring to FIG. 9, the first modulated image 918 and the second modulated image 940 may be input into a control and processing module 950. The control and processing module 950 may compare the first modulated image 918 and the second modulated image 940 to determine whether the object 902 is a live 3D face or is a 2D photograph. For example, if the object 902 is a live 3D face, the first modulated image 918 and the second modulated image 940 may exhibit different amounts and different characteristics of distortions. Therefore, the control and processing module 950 may determine that the object 902 is a live 3D face when the facial signatures in the first modulated image 918 do not match with the facial signatures in the second modulated image 940.

Figure 10:
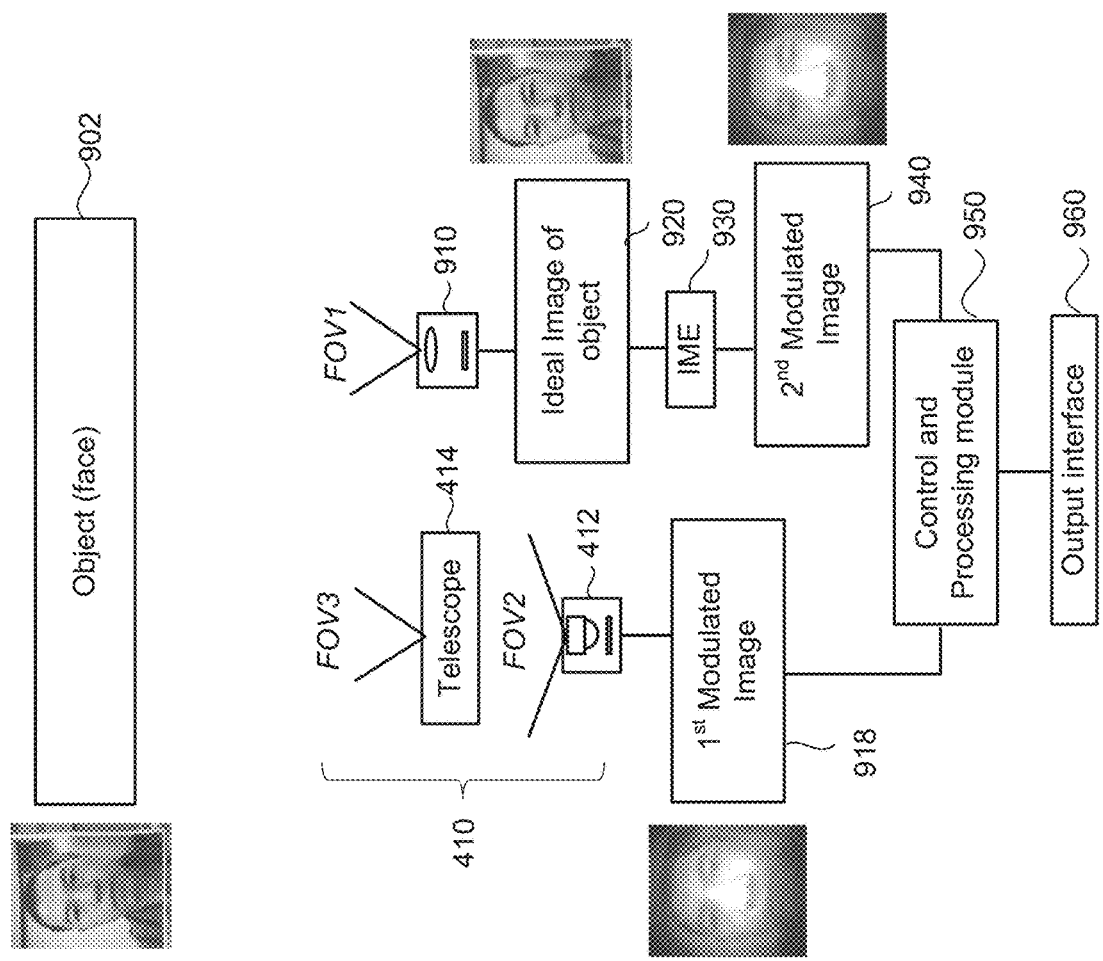
FIG. 10 illustrates an example in which a 2D photograph is used to spoof the security check system illustrated in FIG. 9.

On the other hand, as illustrated in FIG. 10, if the object 902 is a 2D photograph, the first modulated image 918 may exhibit similar distortions as those of the second modulated image 940. Therefore, the control and processing module 950 may determine that the object 902 is a 2D photograph when the facial signatures in the first modulated image 918 match with the facial signatures in the second modulated image 940.

Figure 11:
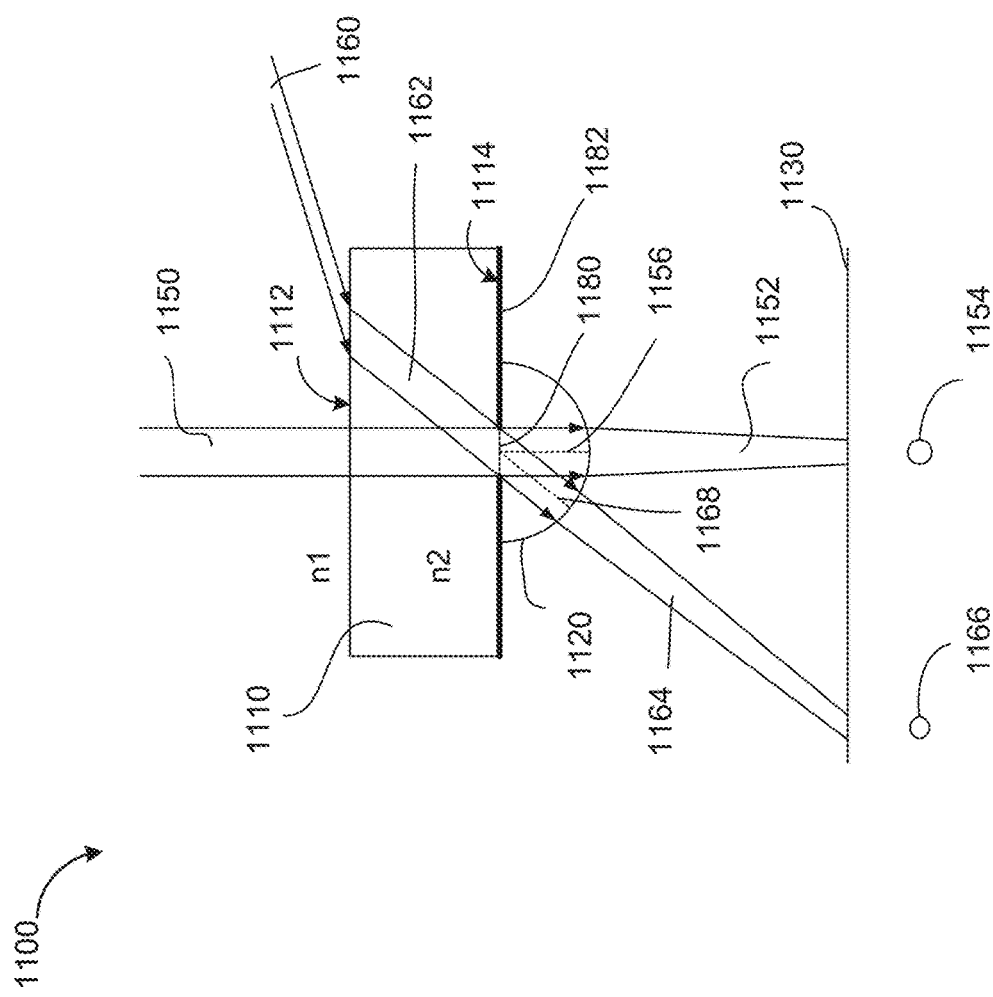
FIG. 11 illustrates schematically an exemplary imaging lens configured to form images with relatively large image modulations according to some embodiments.

Any imaging system that can produce distortions or other types of image aberrations may be used as a depth-aware camera. FIG. 11 illustrates schematically an exemplary imaging lens 1100 configured to form images with relatively large image modulations, such as distortions and spherical aberrations, according to some embodiments. The imaging lens 1100 may include a transparent slab 1110, and a half-ball lens 1120 coupled to the slab 1110. The slab 1110 has a top surface 1112 and a bottom surface 1114. An aperture 1180 may be formed on the bottom surface 1114 of the slab 1110. The aperture 1180 may be formed by applying a light-blocking layer 1182 to the bottom surface 1114 of the slab 1110 with an opening window as the aperture 1180 to allow light to pass therethrough. The center of the aperture 1180 may substantially coincide with the center of the half-ball lens 1120. The aperture 1180 may limit the amount of light energy to be detected at a photodetector.

The slab 1110 may have an index of refraction $n_2$. In some embodiments, the half-ball lens 1120 may have an index of refraction similar to the index of refraction $n_2$ of the slab 1110. In some other embodiments, the half-ball lens 1120 may have an index of refraction different from the index of refraction $n_2$ of the slab 1110. The medium surrounding the imaging lens 1100 may have an index of refraction $n_1$. For example, the slab 1110 may be a piece of glass, which may have an index of refraction ranging from about 1.3 to 2 or greater, depending on the type of glass. The imaging lens 1100 may be surrounded by air, which has an index of refraction approximately equal to one. The combination of the half-ball lens 1120 and the slab 1110 may produce relatively large distortions (e.g., barrel distortions) and spherical aberrations, as discussed below.

As illustrated in FIG. 11, a normal incident light beam 1150 with a relatively small angle of incidence with respect to the normal of the top surface 1112 of the slab 1110 may undergo negligible refraction at the top surface 1112 of the slab 1110. After being transmitted through the aperture 1180, the normal incident light beam 1150 may propagate along the optical axis 1156 of the half-ball lens 1120. Thus, the light beam 1152 emerging out of the half-ball lens 1120 may continue to propagate along the optical axis 1156, and form an image spot 1154 at an image plane 1130 of the imaging lens 1100.

Still referring to FIG. 11, a grazing incident light beam 1160 with a relatively large angle of incidence with respect to the normal of the top surface 1112 of the slab 1110 may undergo a relatively large refraction at the top surface 1112 of the slab 1110. Thus, the refracted light beam 1162 may propagate at a direction that is quite different from the direction of the grazing incident light beam 1160. Note that, for the half-ball lens 1120, any radial direction passing through its center is an optical axis of the half-ball lens 1120. Since the refracted light beam 1162 propagates along the optical axis 1168 of the half-ball lens 1120, the light beam 1164 that emerges out of the half-ball lens 1120 may continue to propagate along the optical axis 1168, and form an image spot 1166 at the image plane 1130.

Therefore, although the grazing incident light beam 1160 undergoes a relatively large refraction at the top surface 1112 of the slab 1110, there is no corrections further along the optical path to compensate for any modulations that may be resulted from the relatively large refraction. As a result, the resulting image may exhibit rather large modulations such as distortions (e.g., barrel distortions) and spherical aberrations. For example, the imaging lens 1100 may produce an image of a building similar to that shown in FIG. 6C, which exhibits severe barrel distortions. Because the incident angle from an object is strongly sensitive to the local depth variations of the object, the amount and characteristics of the modulations may carry depth information about the object. For example, as discussed above, the image of a 3D face shown in FIG. 8B exhibits different amounts and different characteristics of distortions from those exhibited in the image of a 2D photograph shown in FIG. 8C.

It should be appreciated that FIG. 11 illustrates only one example of an imaging lens that can produce relatively large image modulations. One of ordinary skill in the art would recognize many variations, alternatives, and modifications. For example, a single-element thick lens can also be configured to produce relatively large image modulations.

According to some embodiments, a method of security check using anti-spoofing face ID sensing may utilize two cameras. A first camera may be a normal camera configured for nearly ideal imaging (e.g., a front camera of a mobile device); and a second camera may be a depth-aware camera configured to produce relatively large image modulations, such as the camera 412 illustrated in FIGS. 5, 7, and 9 and discussed above.

Figure 12:
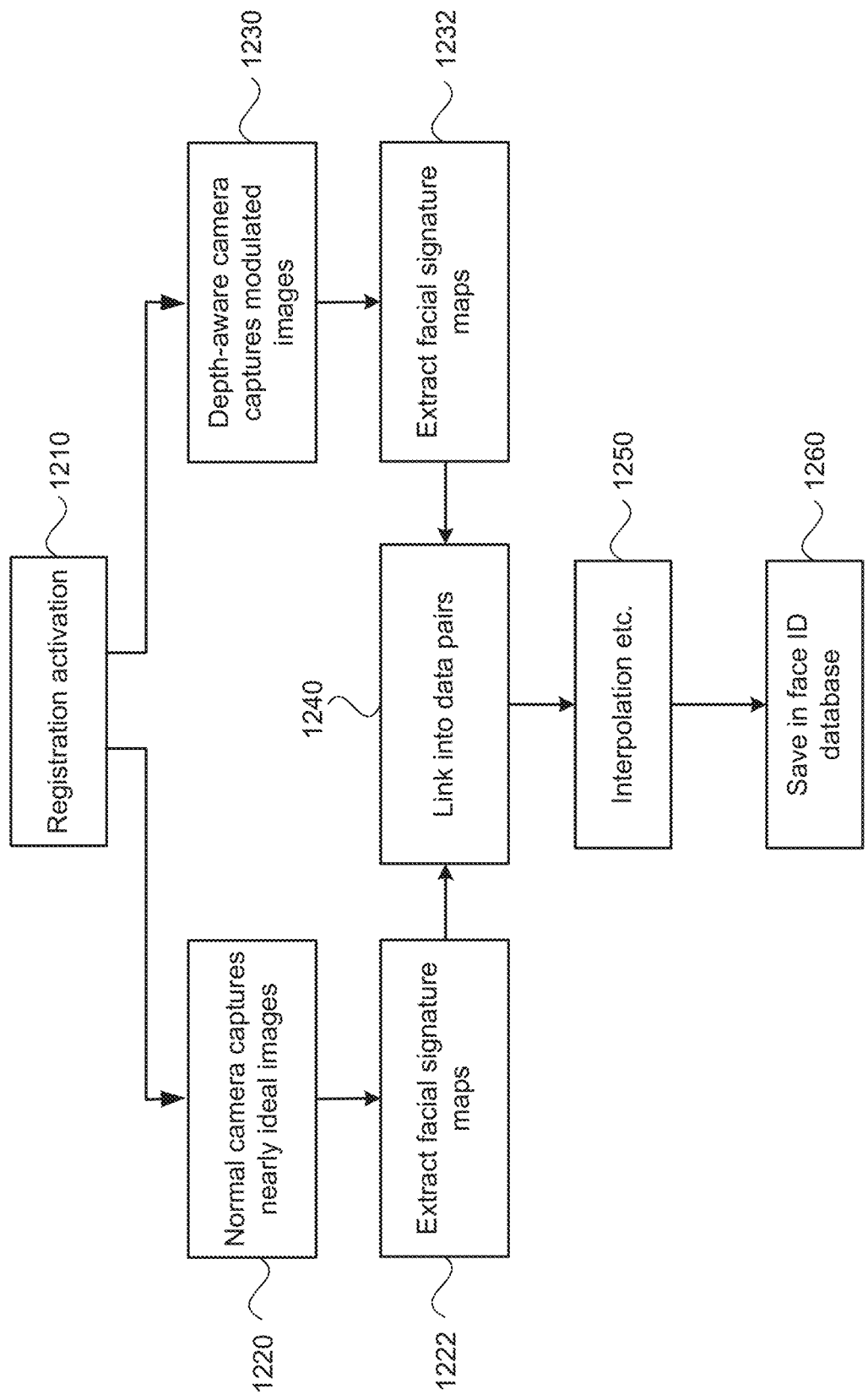
FIG. 12 shows a flowchart illustrating a face ID registration process according to some embodiments.

FIG. 12 shows a flowchart illustrating a face ID registration process according to some embodiments.

At 1210, face ID registration is activated. For example, face ID registration may be activated by an authorized user of a mobile device by selecting face ID registration in "settings," or when the mobile device is turned on by the authorized user for the first time after purchase.

At 1220, the normal camera may capture a first set of images of the authorized user's face. The first set of images may be ideal images of the authorized user's face that exhibit no or small image modulations. In some embodiments, the first set of images may include one or more images of the authorized user's face from different angles.

At 1222, a first set of facial signature maps may be extracted from the first set of images captured by the first camera. For example, facial recognition and image analysis algorithms may be used to extract the first set of facial signature maps.

At 1230, the depth-aware camera may capture a second set of images of the authorized user's face. The second set of images may exhibit relatively large image modulations. In some embodiments, the second set of images may include one or more images of the authorized user's face from different angles. The normal camera and the depth-aware camera may capture images of the authorized user's face simultaneously. That is, a pair of images, one by the normal camera and the other one by the depth-aware camera, may be acquired simultaneously when the authorized user's face is at a certain pose. Thus, images in the first set of images and images in the second set of images may have a one-to-one correspondence.

At 1232, a second set of facial signature maps may be extracted from the second set of images captured by the depth-aware camera, for example, by using facial recognition and image analysis algorithms.

At 1240, the first set of facial signature maps and the second set of facial signature maps may be linked into a set of data pairs.

At 1250, interpolation and other optional operations may be performed on the set of data pairs. For example, interpolation may be performed to cover a range of possible situations.

At 1260, a set of interpolated data pairs are saved in a face ID database, which may be used subsequently for security check, as discussed below with reference to FIG. 13.

Figure 13:
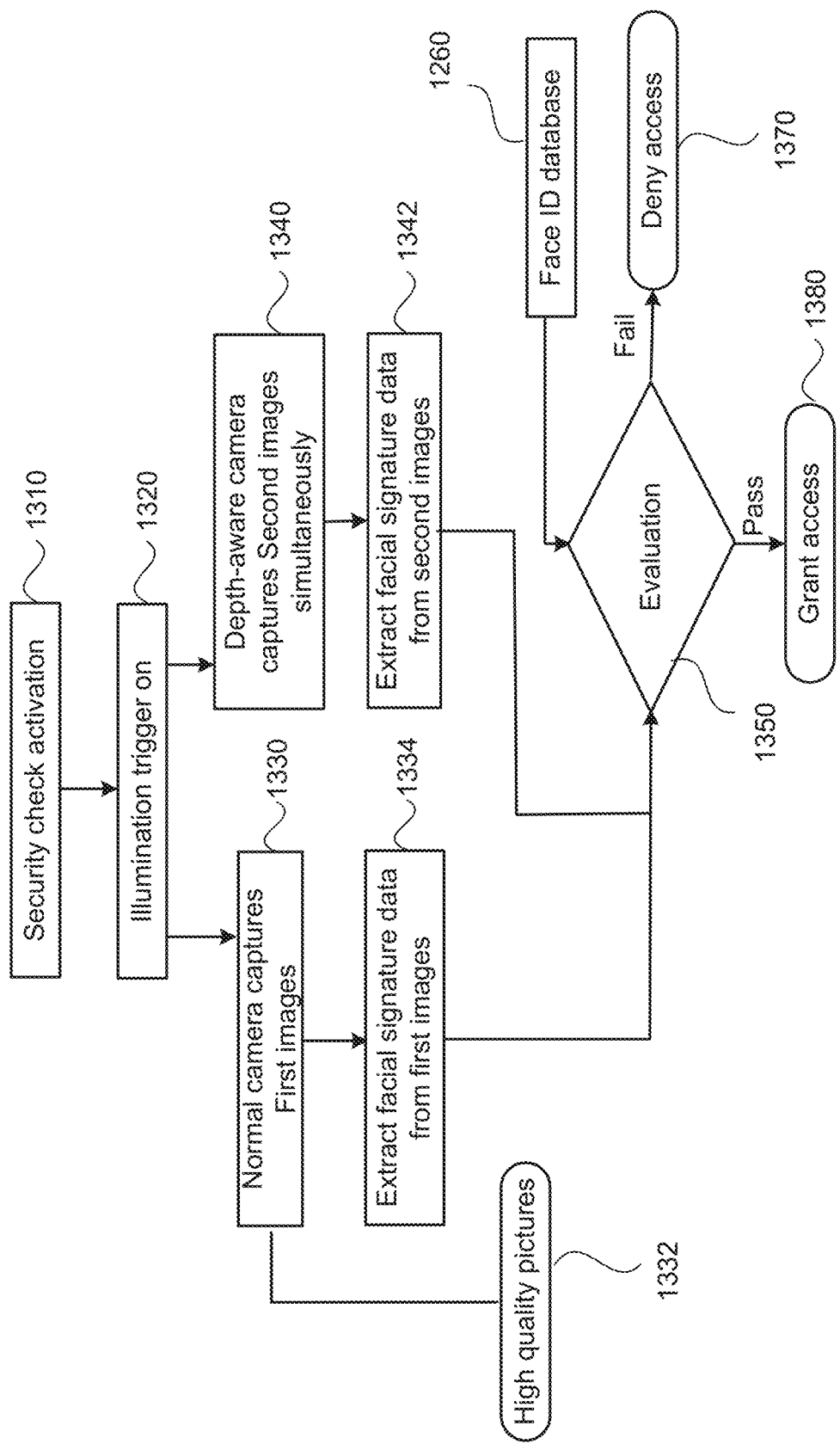
FIG. 13 shows a flowchart illustrating a method of security check using anti-spoofing face ID sensing with two cameras according to some embodiments.

FIG. 13 shows a flowchart illustrating a method of security check using anti-spoofing face ID sensing with two cameras according to some embodiments. The two cameras may include the normal camera and the depth-aware camera as described above.

At 1310, security check may be activated. For example, security check may be activated when a user wakes up the mobile device from sleep mode or turns the mobile device on, or when the user touches a physical button (e.g., a sound volume control button) or plugs in a headphone. Security check may also be activated when a user tries to access an app or process a payment.

At 1320, an illumination light source may be turned on if the mobile device includes an illumination light source (e.g., the illumination light source 420 shown in FIG. 4). For example, the illumination light source may be turned on when the environment is dark. Thus, face ID sensing may be performed even when it is dark.

At 1330, the normal camera may capture one or more first images of the user's face. The first images may be of high quality and exhibit no or small modulations.

At 1332, the normal camera may output the high quality first images. For example, the high quality first images may be saved in a photo album.

At 1334, a first set of facial signature data may be extracted from the one or more first images captured by the normal camera.

At 1340, the depth-aware camera may capture one or more second images of the user's face. The second images may exhibit relatively large modulations, such as distortions. In some embodiments, the normal camera and the depth-aware camera may capture images of the user's face simultaneously, so that there is a one-to-one correspondence between each first image and a corresponding second image.

At 1342, a second set of facial signature data may be extracted from the one or more second images captured by the depth-aware camera.

At 1350, the first set of facial signature data and the second set of facial signature data may be used to evaluate whether they match with the set of data pairs stored in the face ID database 1260, e.g., obtained as illustrated in FIG. 12.

In some embodiments, the evaluation may include two steps. In a first step, the first set of facial signature data may be used to determine whether the user's facial signatures match with the facial signatures of the authorized user. In a second step, the second set of facial signature data may be used to determine whether the second images are images of a 2D photograph instead of a live 3D face. Thus, the first step performs facial matching, and the second step performs spoofing detection. In some other embodiments, the second set of facial signature data may be used to determine whether the user's facial signatures match with the facial signatures of the authorized user; and in the second step, the first set of facial signature data may be used for spoofing detection. In some further embodiments, the first set of facial signature data and the second set of facial signature data may be used together for both facial matching and spoofing detection.

At 1370, if the evaluation result shows a non-match, access may be denied to the user. If the evaluation result shows a match, but spoofing is detected, access may also be denied to the user.

At 1380, if the evaluation result shows both a match and non-spoofing, access may be granted to the user.

According to some embodiments, a method of security check using anti-spoofing face ID sensing may utilize a normal camera and a depth-aware camera. The security check may include two steps: a facial matching step and a spoofing detection step. The images acquired by the normal camera during a registration process may be used to create a face ID database, which may be subsequently used for facial signature matching. Live images acquired by both cameras during security check may be used for spoofing detection, for example, based on the principal illustrated in FIG. 9.

Figure 14:
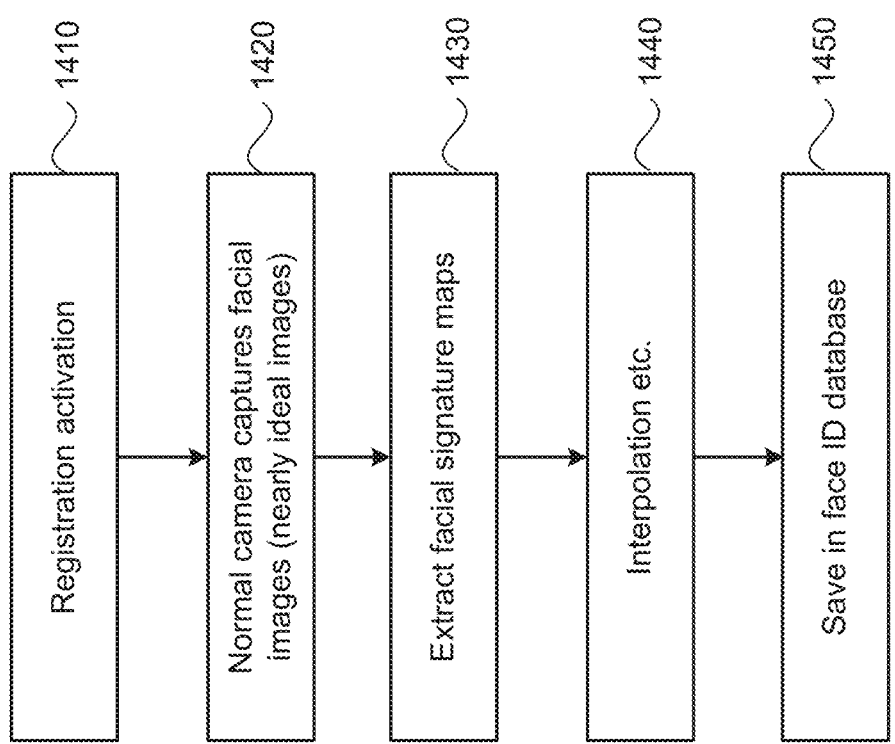
FIG. 14 shows a flowchart illustrating a face ID registration process according to some embodiments.

FIG. 14 shows a flowchart illustrating a face ID registration process according to some embodiments.

At 1410, face ID registration is activated. For example, face ID registration may be activated by an authorized user of a mobile device by selecting face ID registration in "settings," or when the mobile device is turned on by the authorized user for the first time after purchase.

At 1420, the normal camera may capture a set of images of the authorized user's face. The set of images may be ideal images of the authorized user's face that exhibit no or small image modulations. The set of images may include one or more images of the authorized user's face from different angles.

At 1430, a set of facial signature maps may be extracted from the set of images captured by the normal camera, for example, using facial recognition and image analysis algorithms.

At 1440, interpolation and other optional operations may be performed on the set of facial signature maps. For example, interpolation may be performed to cover a range of possible situations.

At 1450, a set of interpolated facial signature maps are saved in a face ID database, which may be used subsequently in a security check process, as discussed below with reference to FIG. 15.

Figure 15:
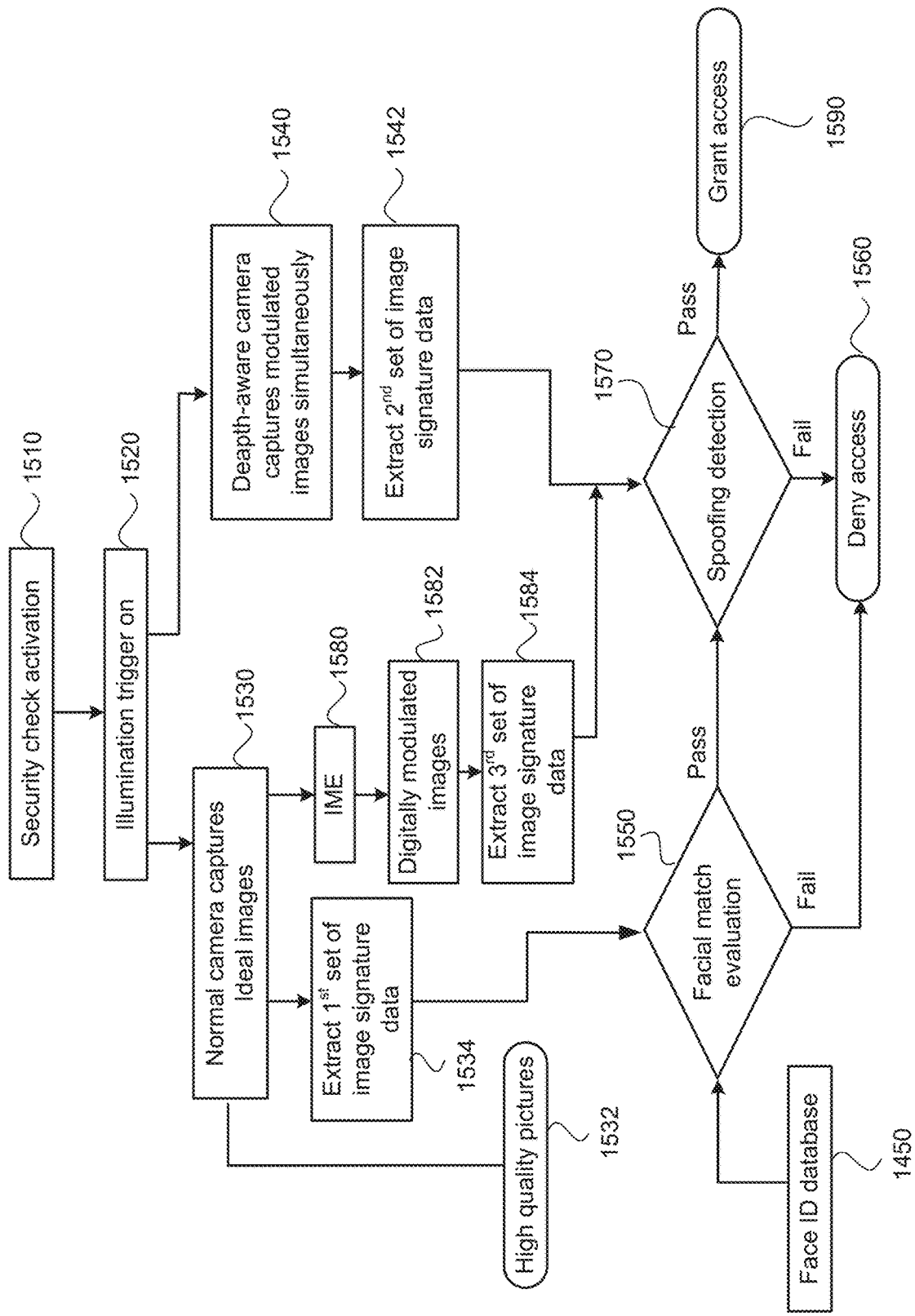
FIG. 15 shows a flowchart illustrating a method of security check using anti-spoofing face ID sensing with two cameras according to some embodiments.

FIG. 15 shows a flowchart illustrating a method of security check using anti-spoofing face ID sensing with two cameras according to some embodiments.

At 1510, security check may be activated. For example, security check may be activated when a user wakes up the mobile device from sleep mode or turns the mobile device on. Security check may also be activated when a user tries to access an app or process a payment.

At 1520, an illumination light source may be turned on if the mobile device includes an illumination light source (e.g., the illumination light source 420 shown in FIG. 4). For example, the illumination light source may be turned on when the environment is dark. Thus, face ID sensing may be performed even when it is dark.

At 1530, the normal camera may capture one or more ideal images of the user's face. The ideal images may be of high quality and exhibit no or small modulations.

At 1532, the normal camera may output the high quality images. For example, the high quality images may be saved in a photo album.

At 1534, a first set of image signature data may be extracted from the one or more ideal images captured by the normal camera.

At 1540, the depth-aware camera may capture one or more modulated images of the user's face. For example, the modulated images may exhibit relatively large distortions (e.g., barrel distortions). The normal camera and the depth-aware camera may capture images of the user's face simultaneously, so that there is a one-to-one correspondence between the ideal images captured by the normal camera and the modulated images captured by the depth-aware camera.

At 1542, a second set of image signature data may be extracted from the one or more images captured by the depth-aware camera.

At 1550, the first set of image signature data extracted from the ideal images captured by the normal camera may be used to evaluate whether they match with the set of facial signature maps stored in the face ID database 1450, e.g., obtained as illustrated in FIG. 14.

At 1560, if the evaluation result shows a non-match, access may be denied to the user.

At 1570, if the evaluation result shows a match, spoofing detection may be performed. According to some embodiments, the spoofing detection may use the ideal images captured by the normal camera and the modulated images captured by the depth-aware camera, as discussed below.

At 1580, an image modulation equalizer (IME) may be applied to the ideal images captured by the normal camera (obtained at 1530). The IME may digitally modulate the ideal images by adding a modulation format to the ideal images, thereby generating the digitally modulated images 1582. In some embodiments, the modulation format may contain the optical phases that would have been produced by the optical elements of the depth-aware camera. Thus, as discussed above with reference to FIG. 9, a digitally modulated image 1582 may be similar to an image that would have been captured by the depth-aware camera if an ideal image is placed in front of the depth-aware camera. In some embodiments, the depth-aware camera may have a set of distortion parameters, and digitally modulating the ideal images may include applying the set of distortion parameters to the ideal images.

At 1584, a third set of image signature data may be extracted from the digitally modulated images 1582.

At 1570, the second set of image signature data 1542 and the third set of image signature data 1584 may be compared to determine whether the images are from a live 3D face or a 2D photograph.

As discussed above with reference to FIG. 9, if a modulated image 1540 captured by the depth-aware camera is of a live 3D face, it would exhibit different modulation characteristics than those of the digitally modulated image 1582, which is equivalent to a modulated image of a 2D photograph. Thus, if the second set of image signature data does not match the third set of image signature data, it may be determined that a live face is being imaged. On the other hand, if the modulated image 1540 captured by the depth-aware camera is of a 2D photograph, it would exhibit similar modulation characteristics as those of the digitally modulated image 1582. Thus, if the second set of image signature data matches the third set of image signature data, it may be determined that a photograph is being used to "spoof" the security check process.

At 1590, if the user passes the spoofing detection at 1570, access is granted.

At 1560, if the user fails the spoofing detection at 1570, access is denied.

According to some embodiments, a method of security check using anti-spoofing face ID sensing may utilize a single camera. The camera may be a depth-aware camera configured to produce relatively large image modulations, such as the camera 412 illustrated in FIGS. 5, 7, and 9 and discussed above.

Figure 16:
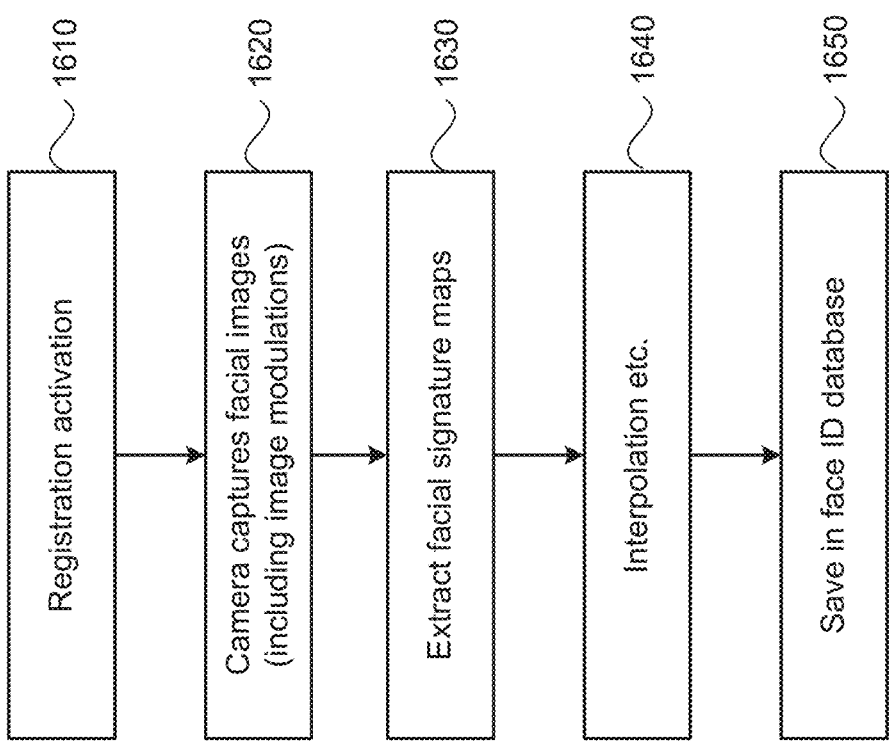
FIG. 16 shows a flowchart illustrating a face ID registration process using a single camera according to some embodiments.

FIG. 16 shows a flowchart illustrating a face ID registration process using a single camera according to some embodiments.

At 1610, face ID registration is activated. For example, face ID registration may be activated by an authorized user of a mobile device by selecting face ID registration in "settings," or when the mobile device is turned on by the authorized user for the first time after purchase.

At 1620, the camera may capture a set of images of the authorized user's face. The camera may be configured to produce relatively large image modulations, such as distortions and other types of image aberrations. The set of images may include one or more images of the authorized user's face from different angles.

At 1630, a set of facial signature maps may be extracted from the set of images captured by the camera, for example, by using facial recognition and image analysis algorithms.

At 1640, interpolation and other optional operations may be performed on the set of facial signature maps. For example, interpolation may be performed to cover a range of possible situations.

At 1650, an interpolated set of facial signature maps are saved in a face ID database, which may be used subsequently for security check, as described below with reference to FIG. 17.

Figure 17:
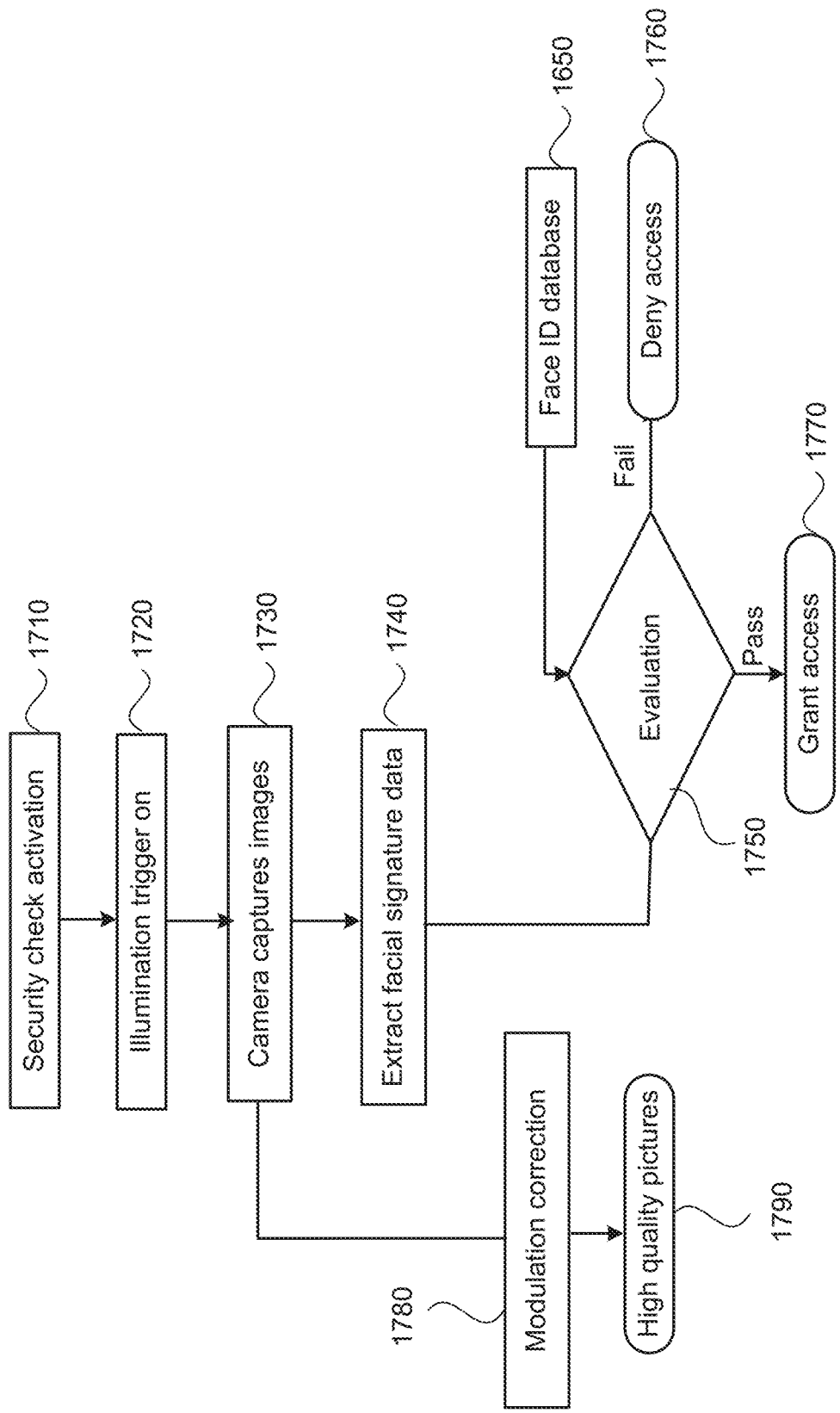
FIG. 17 shows a flowchart illustrating a method of security check using anti-spoofing face ID sensing with a single camera according to some embodiments.

FIG. 17 shows a flowchart illustrating a method of security check using anti-spoofing face ID sensing with a single camera according to some embodiments.

At 1710, security check may be activated. For example, security check may be activated when a user wakes up the mobile device from sleep mode or turns the mobile device on. Security check may also be activated when a user tries to access an app or process a payment.

At 1720, an illumination light source may be turned on if the mobile device includes an illumination light source (e.g., the illumination light source 420 shown in FIG. 4). For example, the illumination light source may be turned on when the environment is dark. Thus, face ID sensing may be performed even when it is dark.

At 1730, the camera may capture one or more images of the user's face. The images may exhibit relatively large modulations, such as distortions.

At 1740, facial signature data may be extracted from the one or more images captured by the camera.

At 1750, the facial signature data is used to evaluate whether the facial signature data matches with the set of facial signature maps stored in the face ID database 1650, e.g., obtained as illustrated in FIG. 16.

At 1760, if the evaluation result shows a non-match, access may be denied to the user.

At 1770, if the evaluation result shows a match, access may be granted to the user.

As discussed above with reference to FIGS. 5 and 7, because the modulated images are sensitive to the depth variations of an object, a spoofing attempt using a 2D photograph of the authorized user may result in a non-match. Thus, the method of security check according to FIG. 17 may be spoofing-proof.

In some embodiments, the single camera may serve both as a face ID sensor and as a front camera. For example, the optical phases produced by the optical elements of the camera that cause image modulations may be transformed into a modulation format. The modulation format may be used to digitally correct the modulations in the images captured by the camera to produce high quality images (e.g., images that have no or small modulations). In other words, the modulated images may be digitally "demodulated" to produce high quality images.

Thus, optionally, at 1780, modulation correction may be performed on the images captured by the camera to obtain high quality (nearly modulation-free) images. At 1790, the high quality images may be output. For example, the high quality images may be saved in a photo album.

Figure 18:
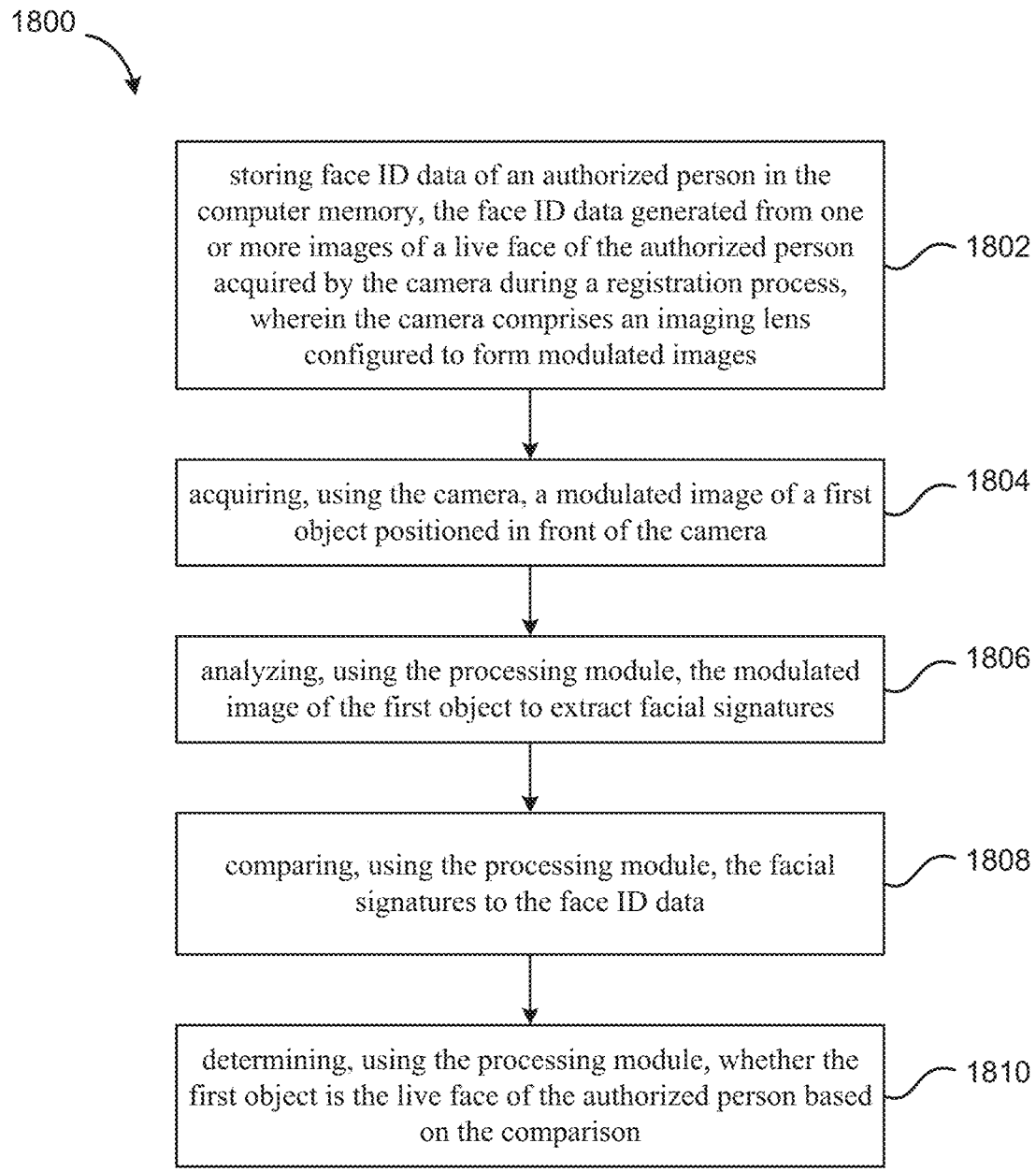
FIG. 18 shows a flowchart illustrating an exemplary method of security check using anti-spoofing face ID sensing for secure access to an electronic platform according to some embodiments.

FIG. 18 shows a flowchart illustrating an exemplary method of security check using anti-spoofing face ID sensing for secure access to an electronic platform according to some embodiments. The method is performed by a security check system that includes a camera, a computer memory, and a processing module.

At 1802, face ID data of an authorized person is stored in the computer memory. The face ID data is generated from one or more images of a live face of the authorized person that are acquired by the camera during a registration process. The camera includes an imaging lens that is configured to form modulated images. For example, the modulated images include image modulations, such as distortions and/or other image aberrations, as discussed above.

At 1804, the camera acquires a modulated image of a first object positioned in front of the camera. The modulated image also include image modulations, such as distortions or other image aberrations.

At 1806, the processing module analyses the modulated image of the first object to extract facial signatures.

At 1808, the processing module compares the facial signatures to the face ID data.

At 1810, the processing module determines whether the first object is the live face of the authorized person based on the comparison. For example, if the processing module determines that the facial signatures match with the face ID data, it may determine that the first object is the live face of the authorized person. On the other hand, if the processing module determines that the facial signatures do not match with the face ID data, it may determine that the first object is not the live face of the authorized person. As discussed above, if a 2D photograph of the face of the authorized person is used to spoof the security check system, a modulated image of the 2D photograph may exhibit different distortions than a modulated image of the live face, and thus may result in a non-match to the face ID data. Therefore, the processing module may determine that the first object is not the live face of the authorized person.

It should be appreciated that the specific steps illustrated in FIG. 18 provide a particular method of security check using face ID sensing for secure access to an electronic platform according to some embodiments. Other sequences of steps may also be performed according to alternative embodiments. For example, alternative embodiments of the present invention may perform the steps outlined above in a different order. Moreover, the individual steps illustrated in FIG. 18 may include multiple sub-steps that may be performed in various sequences as appropriate to the individual step. Furthermore, additional steps may be added or removed depending on the particular applications. One of ordinary skill in the art would recognize many variations, modifications, and alternatives.

Figure 19:
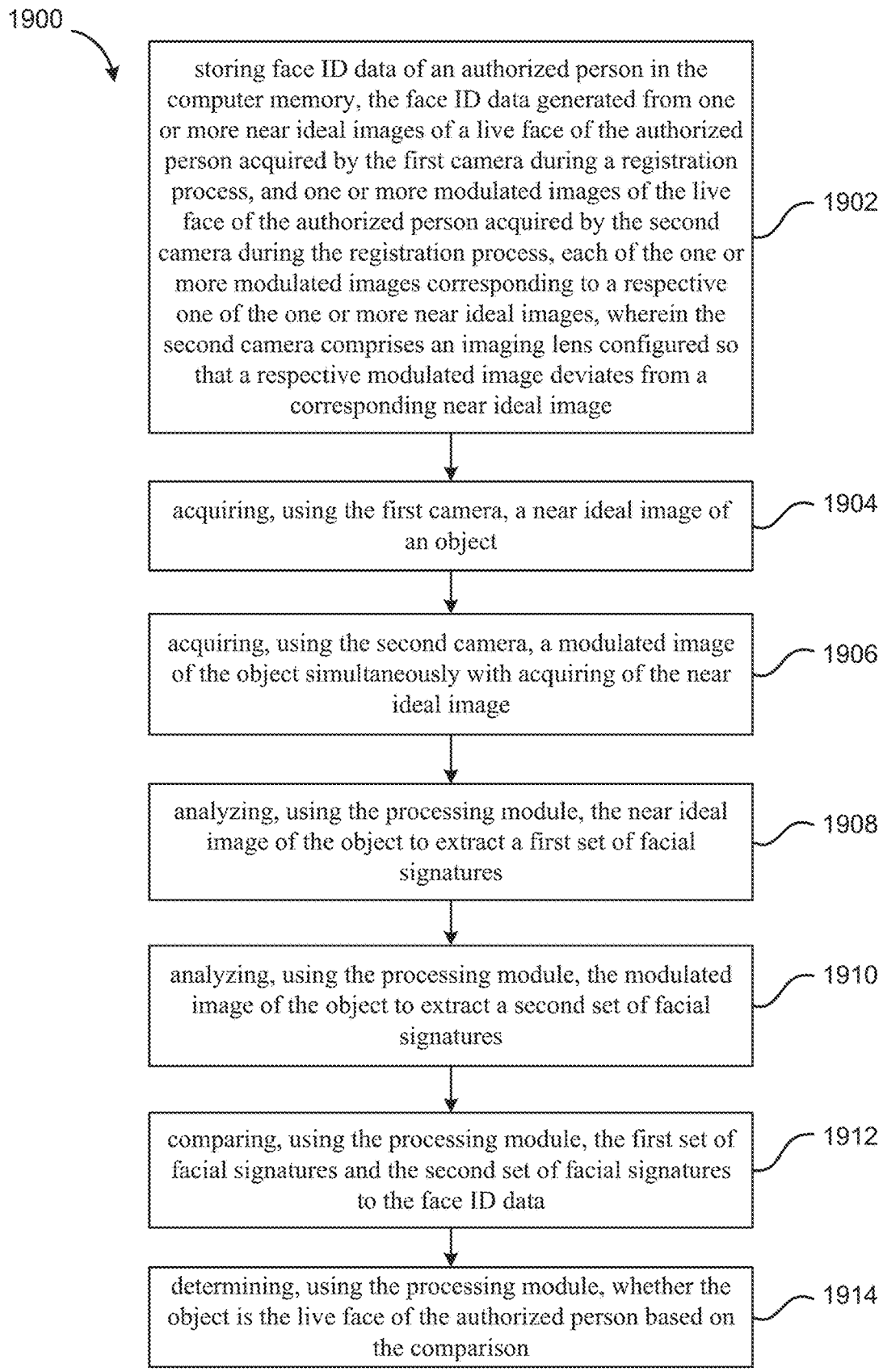
FIG. 19 shows a flowchart illustrating an exemplary method of security check using anti-spoofing face ID sensing for secure access to an electronic platform according to some embodiments.

FIG. 19 shows a flowchart illustrating an exemplary method of security check using anti-spoofing face ID sensing for secure access to an electronic platform according to some embodiments. The method is performed by a security check system that includes a first camera, a second camera, a computer memory, and a processing module.

At 1902, face ID data of an authorized person is stored in the computer memory. The face ID data is generated from one or more near ideal images of a live face of the authorized person acquired by the first camera during a registration process, and one or more modulated images of the live face of the authorized person acquired by the second camera during the registration process. Each of the one or more modulated images corresponds to a respective one of the one or more near ideal images. The second camera includes an imaging lens configured so that a respective modulated image deviates from a corresponding near ideal image. For example, as discussed above, the modulated image may include distortions and/or other types of image aberrations, whereas as the near ideal image may have very little or no distortions and/or other types of image aberrations.

At 1904, the first camera acquires a near ideal image of an object.

At 1906, the second camera acquires a modulated image of the object simultaneously with acquiring of the near ideal image.

At 1908, the processing module analyzes the near ideal image of the object to extract a first set of facial signatures.

At 1910, the processing module analyzes the modulated image of the object to extract a second set of facial signatures.

At 1912, the processing module compares the first set of facial signatures and the second set of facial signatures to the face ID data.

At 1914, the processing module determines whether the object is the live face of the authorized person based on the comparison.

It should be appreciated that the specific steps illustrated in FIG. 19 provide a particular method of security check using face ID sensing for secure access to an electronic platform according to some embodiments. Other sequences of steps may also be performed according to alternative embodiments. For example, alternative embodiments of the present invention may perform the steps outlined above in a different order. Moreover, the individual steps illustrated in FIG. 19 may include multiple sub-steps that may be performed in various sequences as appropriate to the individual step. Furthermore, additional steps may be added or removed depending on the particular applications. One of ordinary skill in the art would recognize many variations, modifications, and alternatives.

Figure 20:
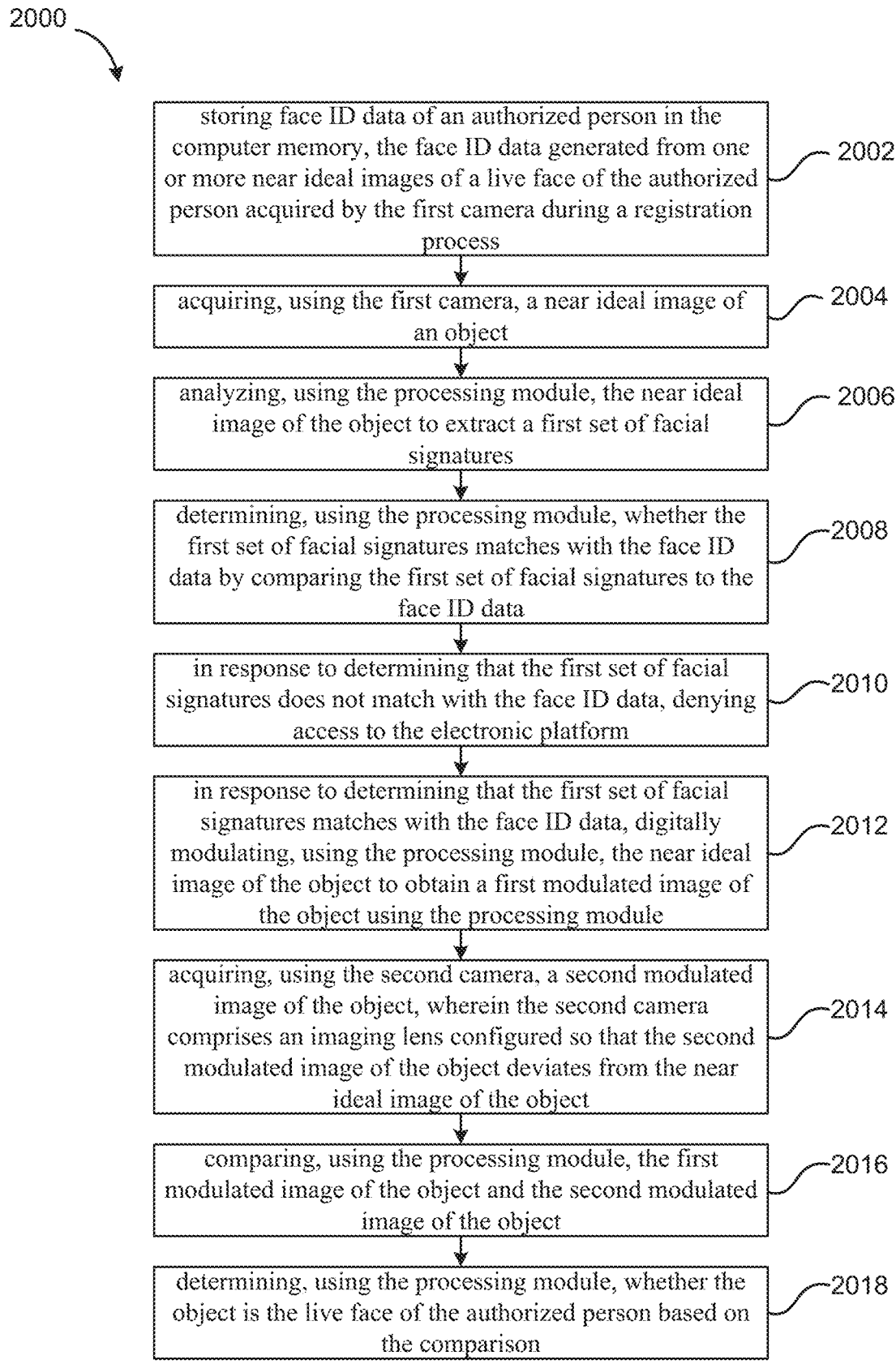
FIG. 20 shows a flowchart illustrating an exemplary method of security check using anti-spoofing face ID sensing for secure access to an electronic platform according to some embodiments.

FIG. 20 shows a flowchart illustrating an exemplary method of security check using anti-spoofing face ID sensing for secure access to an electronic platform according to some embodiments. The method is performed by a security check system that includes a first camera, a second camera, a computer memory, and a processing module.

At 2002, face ID data of an authorized person is stored in the computer memory. The face ID data is generated from one or more near ideal images of a live face of the authorized person acquired by the first camera during a registration process.

At 2004, the first camera acquires a near ideal image of an object.

At 2006, the processing module analyzes the near ideal image of the object to extract a first set of facial signatures.

At 2008, the processing module determines whether the first set of facial signatures matches with the face ID data by comparing the first set of facial signatures to the face ID data.

At 2010, in response to determining that the first set of facial signatures does not match with the face ID data, access to the electronic platform is denied.

At 2012, in response to determining that the first set of facial signatures matches with the face ID data, the processing module digitally modulates the near ideal image of the object to obtain a first modulated image of the object using the processing module.

At 2014, the second camera acquires a second modulated image of the object. The second camera includes an imaging lens configured so that the second modulated image of the object deviates from the near ideal image of the object.

At 2016, the processing module compares the first modulated image of the object and the second modulated image of the object.

At 2018, the processing module determines whether the object is the live face of the authorized person based on the comparison.

It should be appreciated that the specific steps illustrated in FIG. 20 provide a particular method of security check using face ID sensing for secure access to an electronic platform according to some embodiments. Other sequences of steps may also be performed according to alternative embodiments. For example, alternative embodiments of the present invention may perform the steps outlined above in a different order. Moreover, the individual steps illustrated in FIG. 20 may include multiple sub-steps that may be performed in various sequences as appropriate to the individual step. Furthermore, additional steps may be added or removed depending on the particular applications. One of ordinary skill in the art would recognize many variations, modifications, and alternatives.

II. Anti-Spoofing Face ID Sensing Based on Retro-Reflection

According to some embodiments, a security check system for secure access to an electronic platform may use anti-spoofing face ID sensing based on retro-reflection from a user's eye. Such a security check system may be able to detect whether a live face is being authenticated, or a photograph or a statue is being used to fool the security check system.

Figure 21:
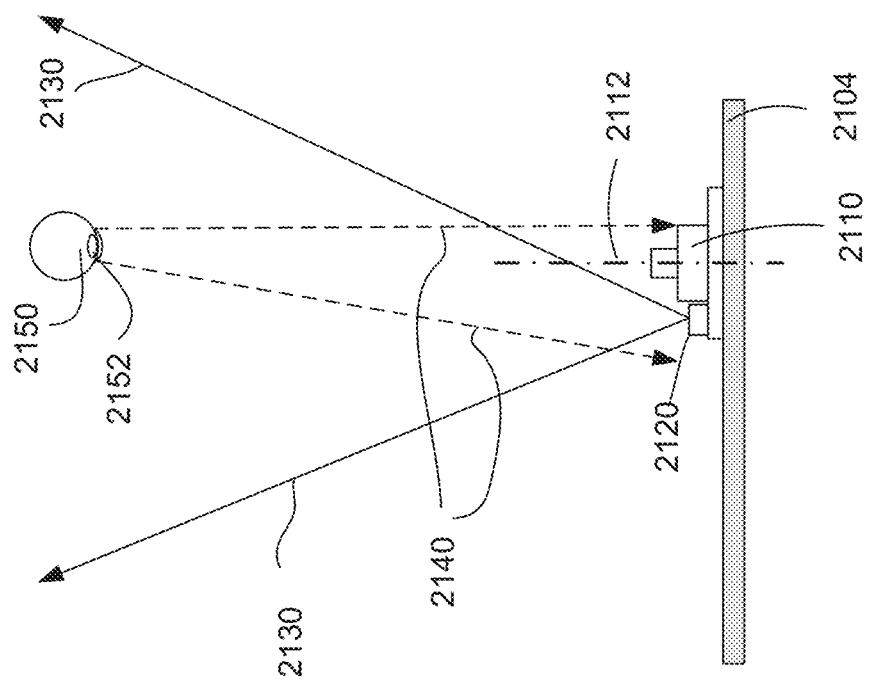
FIG. 21 illustrates schematically an anti-spoofing face ID sensor based on retro-reflection according to some embodiments.

FIG. 21 illustrates schematically an anti-spoofing face ID sensor based on retro-reflection according to some embodiments. The face ID sensor includes a camera 2110. The camera 2110 may be mounted on a frame 2104 of a mobile device. The camera 2110 may be configured to acquire images of objects within its field of view. The face ID sensor also includes an illumination light source 2120 disposed in close proximity to the optical axis 2112 of the camera 2110. The illumination light source 2120 may be configured to shine a light beam 2130 at objects directly in front of the camera 2110. In some embodiments, the illumination light source 2120 may emit infrared light (e.g., at about 940 nm wavelength) that is eye-safe.

Figure 22A:
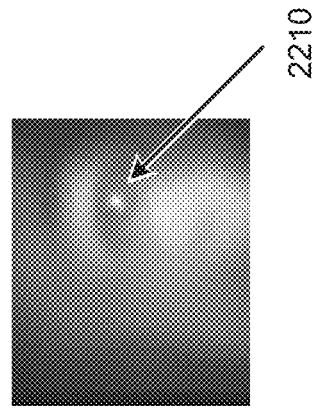
FIGS. 22A and 22B shows an image of a live face that shows a bright spot in an eye caused by retro-reflection by the cornea of the eye, and an image of a photograph of the face, respectively.

Retro-reflection may occur when the light beam 2130 emitted by the illumination light source 2120 shines on a human eye 2150. Retro-reflection is a phenomenon of light rays striking a surface and being redirected back to the source of light. As illustrated in FIG. 21, the cornea 2152 of a human eyeball 2150 may retro-reflect a portion of the light beam 2130 incident thereon, thereby generating a retro-reflected light beam 2140 directed back toward the illumination light source 2120. Therefore, if a live human face is being imaged by the camera 2110 and the camera 2110 is positioned in close proximity to the illumination light source 2120, the image of the human face formed by the camera 2110 may show a bright spot 2210 in the eye due to the retro-reflected light beam 2140, as illustrated in FIG. 22A.

Figure 22B:
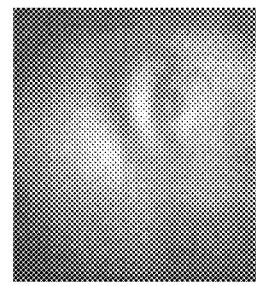

In comparison, a photograph or a statue that does not have a human eyeball 2150 may diffusely scatter the light beam 2130 shining on it, and may not produce the retro-reflected light beam 2140 directed back toward the illumination light source 2120. Thus, an image of a photograph or a statue may not contain a bright spot in the eye, as illustrated in the image of a photograph shown in FIG. 22B. Thus, the bright spot in the eye may be used as a signature for distinguishing a live face from a photograph or a statue.

In some embodiments, the camera 2110 may be a normal camera that is configured to produce nearly ideal images that are modulation free. In some other embodiments, the camera 2110 may be a depth-aware camera that is configured to produce relatively large modulations, such as distortions, as discussed above.

Note that, if a spoofing attempt uses a picture of a human face on a display screen of another mobile device, such as a smart phone, to fool the face ID sensor, the display screen of the other mobile device may also retro-reflect the light beam 2130 shining on it. However, such a retro-reflected light beam will not only come from the eye of the human face, but also from other areas of the human face. Therefore, such a retro-reflected light beam will not result in the signature bright spot 2210 in the eye as shown in FIG. 22A. Thus, the face ID sensor illustrated in FIG. 21 may be able to distinguish a picture on a screen from a live person.

Figure 23:
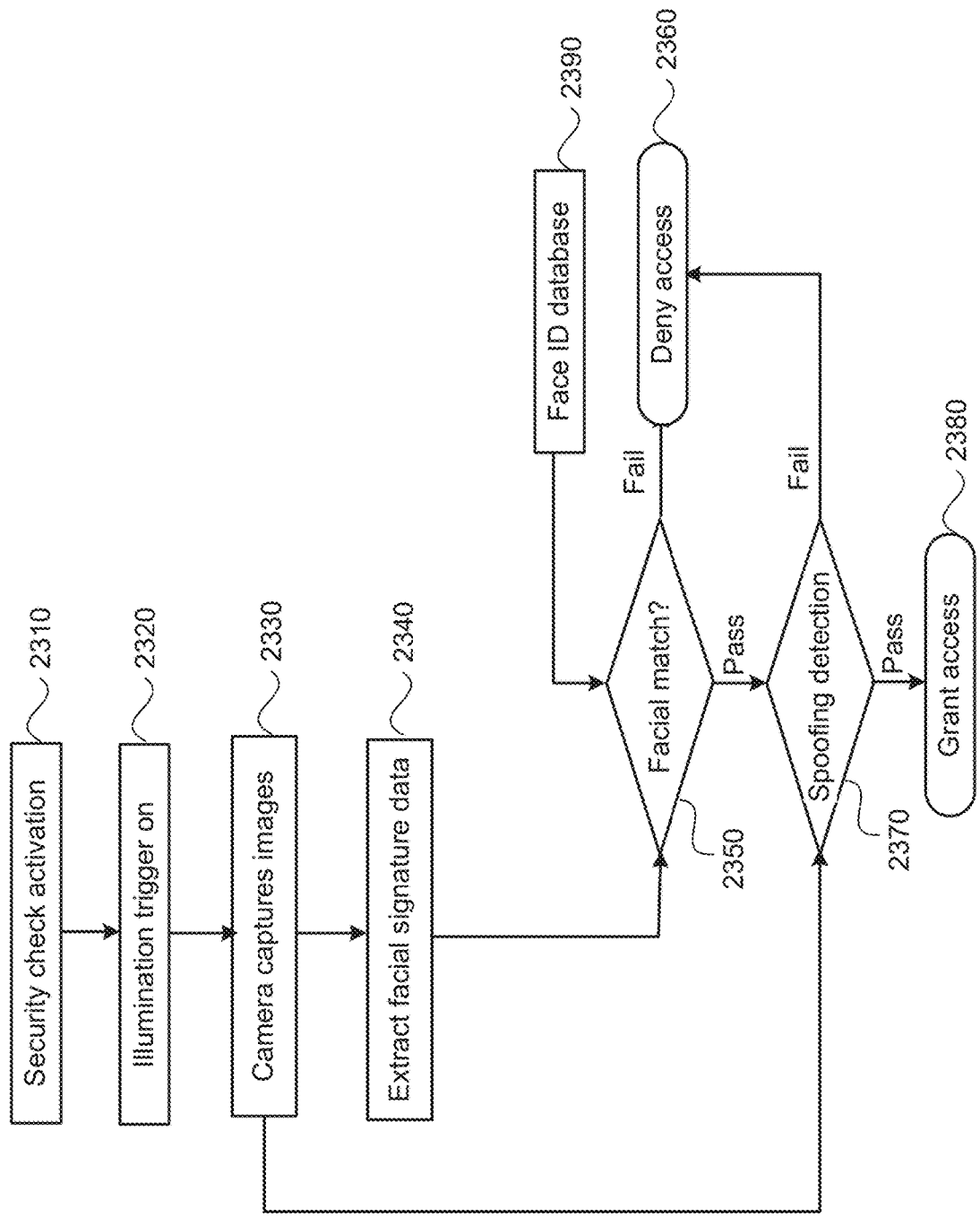
FIG. 23 shows a flowchart illustrating a method of security check using anti-spoofing face ID sensing based on retro-reflection according to some embodiments.

FIG. 23 shows a flowchart illustrating a method of security check using anti-spoofing face ID sensing based on retro-reflection according to some embodiments. An anti-spoofing face ID sensor may include an illumination light source 2110 and a camera 2120 positioned in close proximity to the illumination light source 2110, as illustrated in FIG. 21.

At 2310, security check may be activated. For example, security check may be activated when a user wakes up the mobile device from sleep mode or turns the mobile device on. Security check may also be activated when a user tries to access an app or process a payment.

At 2320, the illumination light source 2120 may be turned on.

At 2330, the camera 2110 may capture one or more images of the user's face.

At 2340, facial signature data may be extracted from the one or more images captured by the camera.

At 2350, the facial signature data is compared to the facial signature maps stored in the face ID database 2390. The facial signature maps may be obtained from an authorized user during a registration process and saved in the ID database 2390 as discussed above.

At 2360, if the comparison shows a non-match, access may be denied to the user.

At 2370, if the comparison shows a match, spoofing detection may be performed, by analyzing the one or more images captured by the camera to evaluate whether a retro-reflection signature is present. If it is determined that the retro-reflection signature is absent, the security check system may determine that it is a spoofing attempt, and thus may deny access.

At 2380, if it is determined that the retro-reflection signature is present, the security check system may determine that it is not a spoofing attempt, and thus may grant access.

Figure 24:
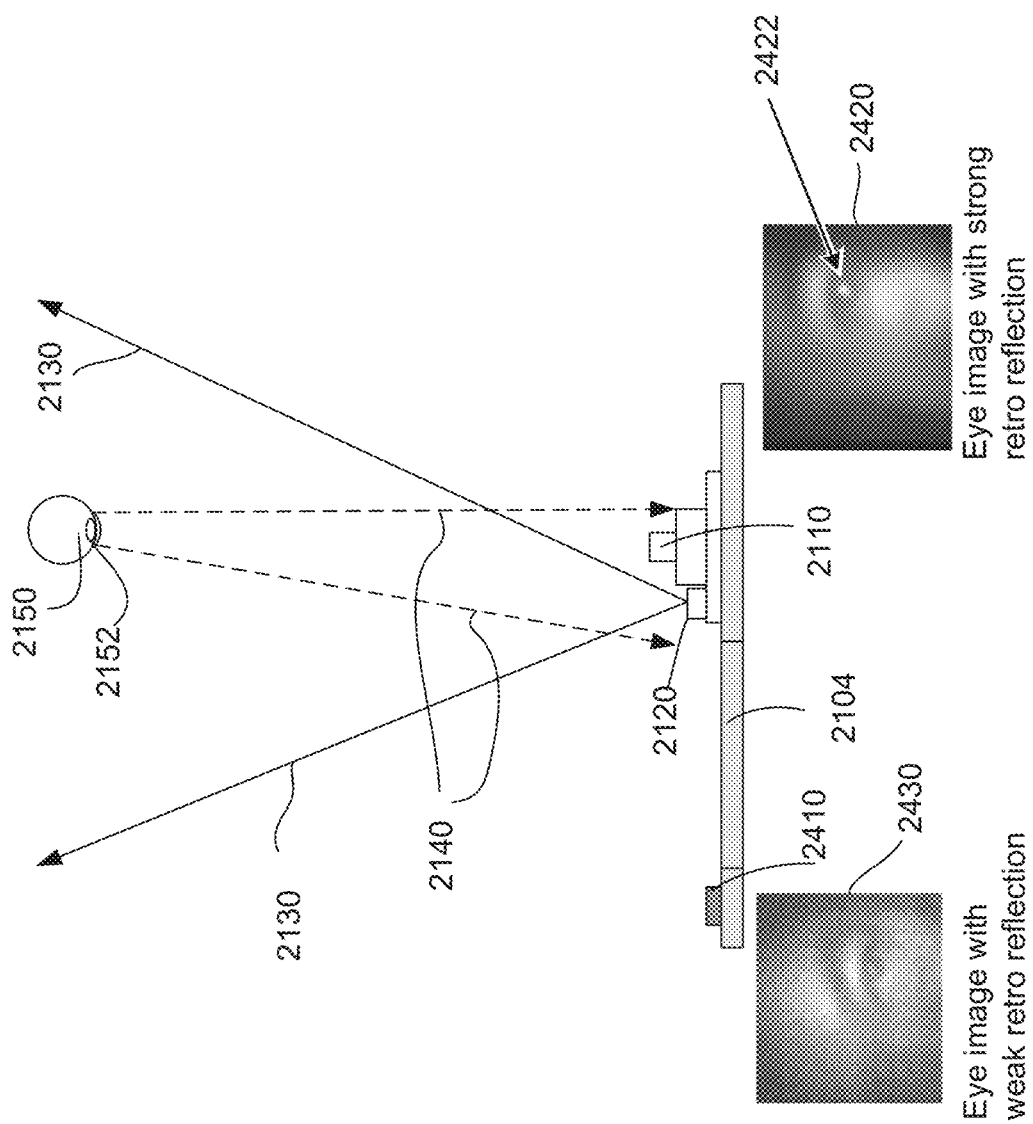
FIG. 24 illustrates schematically an anti-spoofing face ID sensor based on retro-reflection according to some other embodiments.

FIG. 24 illustrates schematically an anti-spoofing face ID sensor based on retro-reflection according to some other embodiments. The face ID sensor is similar to the face ID sensor illustrated in FIG. 21, but it includes a second camera 2410 disposed relatively far away from the illumination light source 2120. Because the second camera 2410 is positioned relatively far away from the illumination light source 2120, the retro-reflected light beam 2140 from the eyeball 2150 may not reach the second camera 2410. Thus, an image 2430 of the eye formed by the second camera 2410 may not show a bright spot in the eye caused by retro-reflection from the cornea 2152 of the eyeball 2150. On the other hand, as discussed above, because the first camera 2110 is positioned close to the illumination light source 2120, an image 2420 of the eye formed by the first camera 2110 may show a bright spot 2422 in the eye caused by the retro-reflected light beam 2140.

According to some embodiments, a security check system may compare the image 2420 formed by the first camera 2110 and the image 2430 formed by the second camera 2410 to determine whether it is a live face being authenticated, or a photograph or a statue is being used to "spoof" the security check system. For example, if the image 2420 captured by the first camera 2110 shows a bright spot 2422 in the eye, while the image 2430 captured by the second camera 2410 does not show such a bright spot in the eye, the security check system may determine that it is a live face being authenticated. As another example, if neither of the two images 2420 and 2430 show a bright spot in the eye, the security check system may determine that it is not a live face being authenticated.

Figure 25:
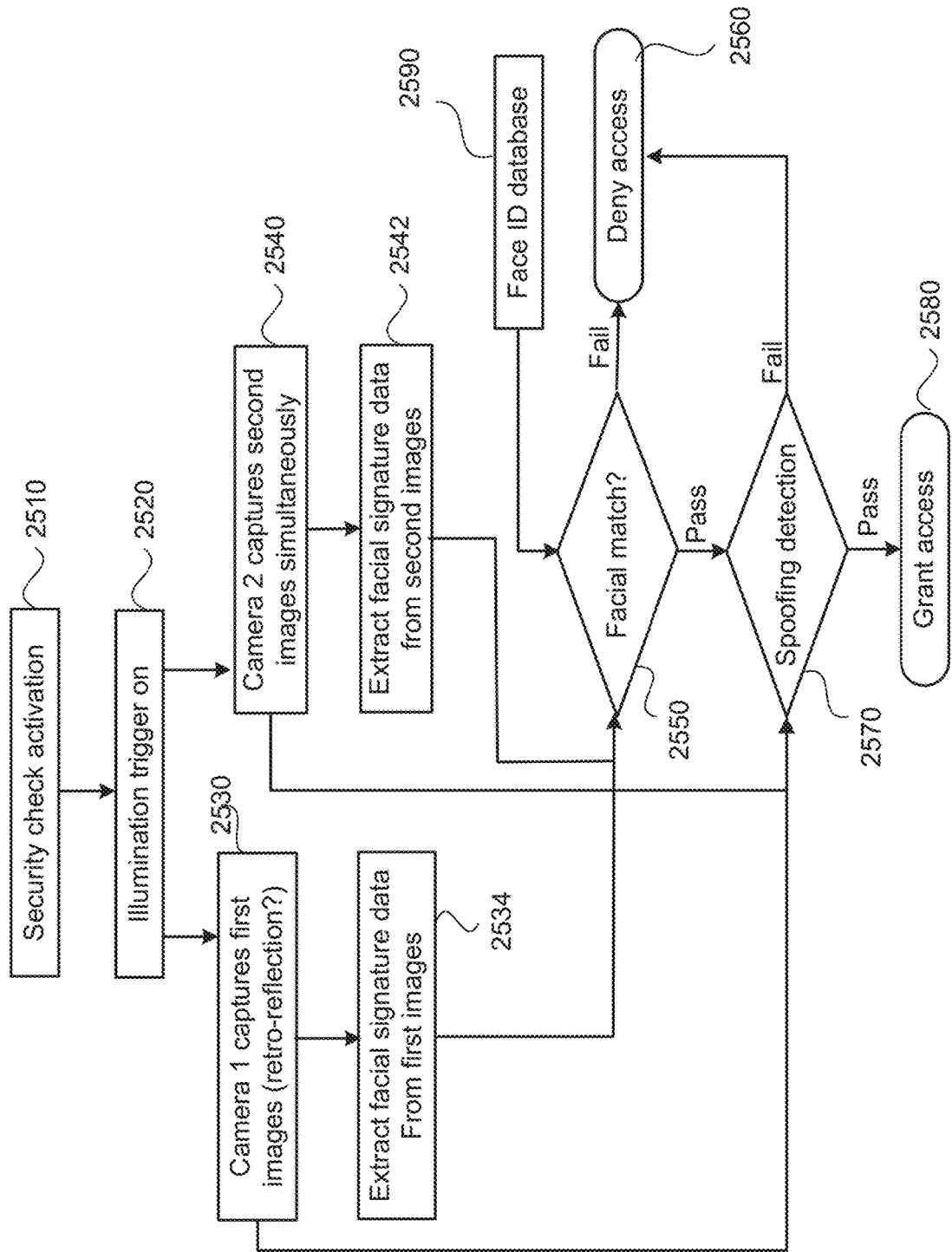
FIG. 25 shows a flowchart illustrating a method of security check using anti-spoofing face ID sensing based on retro-reflection with two cameras according to some embodiments.

FIG. 25 shows a flowchart illustrating a method of security check using anti-spoofing face ID sensing based on retro-reflection with two cameras according to some embodiments. The two cameras may include a first camera 2110 that is positioned in close proximity to the illumination light source 2120, and a second camera 2410 that is positioned relative far apart from the illumination light source 2120, as illustrated in FIG. 24.

At 2510, security check may be activated. For example, security check may be activated when a user wakes up the mobile device from sleep mode or turns the mobile device on, or when the user touches a physical button (e.g., a sound volume control button) or plugs in a headphone. Security check may also be activated when a user tries to access an app or process a payment.

At 2520, the illumination light source may be turned on.

At 2530, the first camera may capture one or more first images of the user's face.

At 2534, a first set of facial signature data may be extracted from the one or more first images captured by the first camera.

At 2540, the second camera may capture one or more second images of the user's face.

In some embodiments, the first camera and the second camera may capture images simultaneously, so that there may be a one-to-one correspondence between each first image and a corresponding second image.

At 2542, a second set of facial signature data may be extracted from the one or more second images captured by the second camera.

At 2550, the first set of facial signature data and/or the second set of facial signature data may be used to evaluate whether they match with facial signature maps stored in the face ID database 2560. The facial signature maps may be obtained from an authorized user during a registration process and saved in the ID database 2590 as discussed above.

At 2560, if it is determined that there is no match, access may be denied.

At 2570, if it is determined that there is a match, spoofing detection may be performed, by comparing the first images captured by the first camera and the second images captured by the second camera. As discussed above, if it is a live person being authenticated, the first images captured by the first camera may show a retro-reflection signature in the eye. Whereas, the second images captured by the second camera may not show a retro-reflection signature in the eye regardless of whether it is a live person being authenticated. Thus, if the retro-reflection signature is identified in the first images and not in the second images, it may be determined that a live person is being authenticated. On the other hand, if the retro-reflection signature is absent in both the first images and the second images, it may be determined that it is a spoofing attempt, and therefore access may be denied.

At 2580, if it is determined that a live person is being authenticated, access may be granted.

III. Anti-Spoofing Face ID Sensing Based on Both Image Modulations and Retro-Reflection In some embodiments, retro-reflection signatures may be used in combination with image modulations to detect spoofing. For example, referring to FIG. 21, the camera 2110 may be a depth-aware camera configured to form modulated images of a user's face. As described above, image modulations may be used to detect whether the object being imaged is a 3D object with a certain depth variations, or a 2D photograph. However, if a spoofing attempt uses a 3D statue to full the face ID sensor, a spoofing detection method based solely on image modulations may not be able to detect the spoofing attempt. On the other hand, a spoofing detection method based on retro-reflection of a human eye can distinguish between a human face or a statute. Thus, by combining the two methods, the face ID sensor may be able to detect spoofing attempts using either a photograph or a statue.

As another example, referring to FIG. 4, face ID sensing may use the front camera 160, the depth-aware camera 410, and the illumination light source 420 positioned close to the depth-aware camera 410. The front camera 160 may capture ideal images of a person, while the depth-aware camera 410 may capture modulated images of the person. The ideal images and the modulated images may be used to detect spoofing using a photograph, as discussed above. At the same time, the presence or absence of a retro-reflection signature in the modulated images captured by the depth-aware camera 410 may be used to detect spoofing using a statue.

Figure 26:
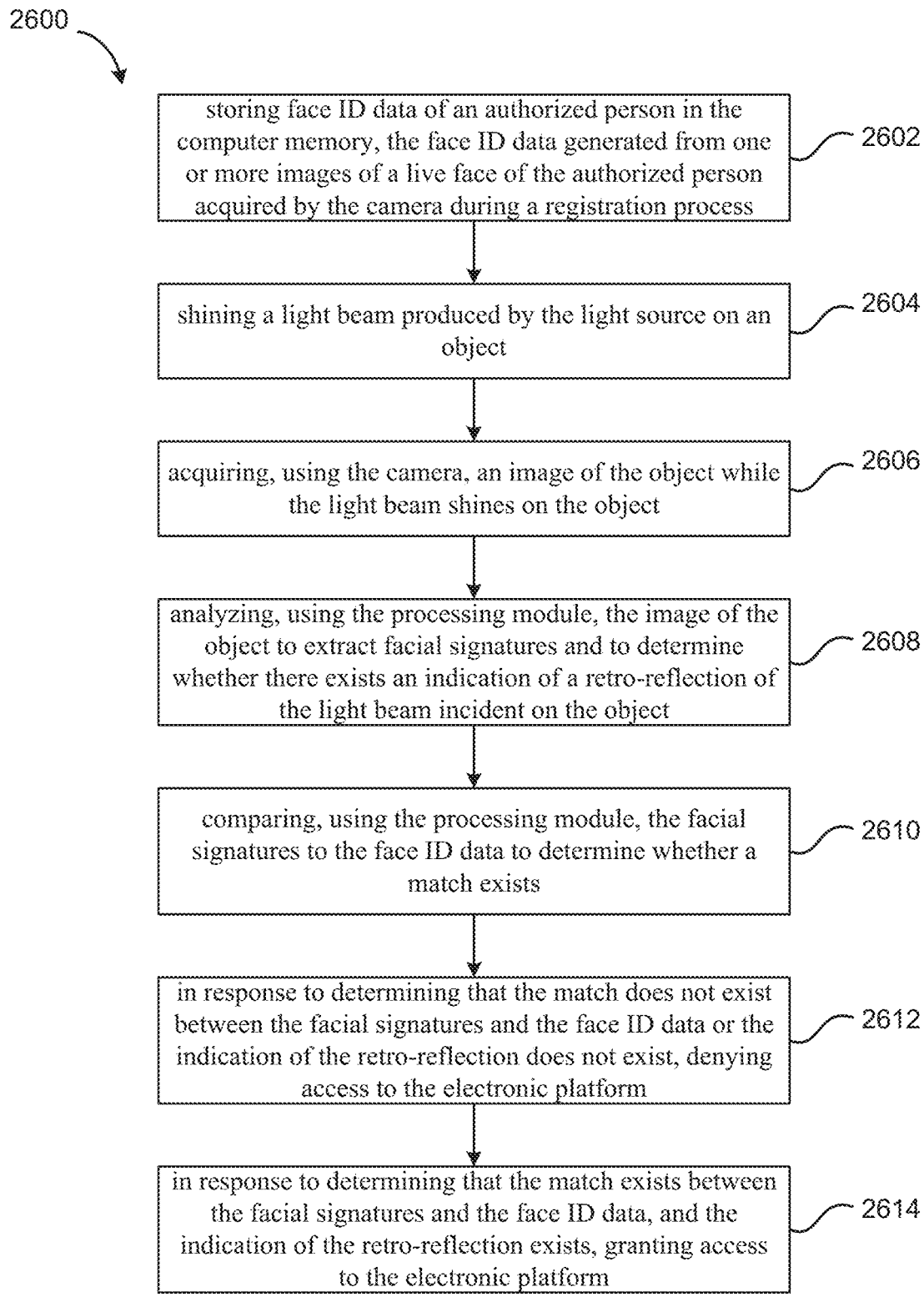
FIG. 26 shows a flowchart illustrating an exemplary method of security check using face ID sensing for secure access to an electronic platform according to some embodiments.

FIG. 26 shows a flowchart illustrating an exemplary method of security check using face ID sensing for secure access to an electronic platform according to some embodiments. The method is performed by a security check system that includes a light source, a camera disposed adjacent the light source, a computer memory, and a processing module.

At 2602, face ID data of an authorized person is stored in the computer memory. The face ID data is generated from one or more images of a live face of the authorized person acquired by the camera during a registration process.

At 2604, the light source shines a light beam on an object.

At 2606, the camera acquires an image of the object while the light beam shines on the object.

At 2608, the processing module analyzes the image of the object to extract facial signatures and to determine whether there exists an indication of a retro-reflection of the light beam incident on the object.

At 2610, the processing module compares the facial signatures to the face ID data to determine whether a match exists.

At 2612, in response to determining that the match does not exist between the facial signatures and the face ID data or the indication of the retro-reflection does not exist, access to the electronic platform is denied.

At 2614, in response to determining that the match exists between the facial signatures and the face ID data, and the indication of the retro-reflection exists, access to the electronic platform is granted.

It should be appreciated that the specific steps illustrated in FIG. 26 provide a particular method of security check using face ID sensing for secure access to an electronic platform according to some embodiments. Other sequences of steps may also be performed according to alternative embodiments. For example, alternative embodiments of the present invention may perform the steps outlined above in a different order. Moreover, the individual steps illustrated in FIG. 26 may include multiple sub-steps that may be performed in various sequences as appropriate to the individual step. Furthermore, additional steps may be added or removed depending on the particular applications. One of ordinary skill in the art would recognize many variations, modifications, and alternatives.

While this disclosure contains many specifics, these should not be construed as limitations on the scope of any invention or of what may be claimed, but rather as descriptions of features that may be specific to particular embodiments of particular inventions. Certain features that are described in this patent document in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Moreover, the separation of various system components in the embodiments described in this patent document should not be understood as requiring such separation in all embodiments.

Only a few implementations and examples are described and other implementations, enhancements and variations can be made based on what is described and illustrated in this patent document.

A recitation of "a", "an" or "the" is intended to mean "one or more" unless specifically indicated to the contrary.

Ranges may be expressed herein as from "about" one specified value, and/or to "about" another specified value. The term "about" is used herein to mean approximately, in the region of, roughly, or around. When the term "about" is used in conjunction with a numerical range, it modifies that range by extending the boundaries above and below the numerical values set forth. In general, the term "about" is used herein to modify a numerical value above and below the stated value by a variance of 10%. When such a range is expressed, another embodiment includes from the one specific value and/or to the other specified value. Similarly, when values are expressed as approximations, by use of the antecedent "about," it will be understood that the specified value forms another embodiment. It will be further understood that the endpoints of each of the ranges are included with the range.

All patents, patent applications, publications, and descriptions mentioned here are incorporated by reference in their entirety for all purposes. None is admitted to be prior art.

What is claimed is:

1. A security check system using face ID sensing for secure access to an electronic platform, the security check system comprising:
    a light source configured to provide a light beam to be incident on an object;
    a camera disposed adjacent to the light source and configured to form an image of the object while the light beam is incident on the object;
    a computer memory configured to store face ID data of an authorized person, the face ID data being generated from one or more images of a face of the authorized person acquired by the camera during a registration process; and
    a processing module coupled to the camera and the computer memory, the processing module configured to:
        analyze the image of the object to extract facial signatures and to determine whether there exists an indication of a retro-reflection of the light beam incident on the object;
        compare the facial signatures to the face ID data to determine whether a match exists between the facial signatures and the face ID data;
        in response to determining that the match exists between the facial signatures and the face ID data and the indication of the retro-reflection exists, grant access to the electronic platform; and
        in response to determining that the match does not exist between the facial signatures and the face ID data or the indication of the retro-reflection does not exist, deny access to the electronic platform.

2. The security check system of claim 1, wherein the indication of the retro-reflection comprises a bright spot in an eye in the image of the object.

3. The security check system of claim 1, wherein the light source is configured to provide the light beam in an infrared wavelength range.

4. The security check system of claim 1, wherein the camera and the light source are mounted on a frame of the electronic platform.

5. The security check system of claim 1, wherein the camera comprises an imaging lens configured such that the image of the object is an ideal image of the object.

6. The security check system of claim 1, wherein the camera comprises an imaging lens configured such that the image of the object include modulations.

7. The security check system of claim 6, wherein the modulations comprise distortions.

8. A security check system using face ID sensing for secure access to an electronic platform, the security check system comprising:
    a light source attached to a frame of the electronic platform and configured to provide an incident light beam to be incident on an object;
    a first camera attached to the frame of the electronic platform and configured to form a first image of the object while the incident light beam is incident on the object, the first camera positioned adjacent to the light source such that a retro-reflected light beam caused by the incident light beam is within a field of view (FOV) of the first camera;
    a second camera attached to the frame of the electronic platform and configured to form a second image of the object while the incident light beam is incident on the object, the second camera being spaced apart from the light source such that the retro-reflected light beam is outside a FOV of the second camera;
    a computer memory configured to store face ID data of an authorized person, the face ID data being generated from at least one of:
        one or more first images of a live face of the authorized person acquired by the first camera during a registration process; or
        one or more second images of the live face of the authorized person acquired by the second camera during the registration process; and a processing module coupled to the first camera, the second camera, and the computer memory, the processing module configured to:
- analyze at least one of the first image of the object or the second image of the object to extract facial signatures;
- compare the facial signatures to the face ID data to determine whether a match exists;
- compare the first image of the object to the second image of the object to determine whether there exists an indication of the retro-reflected light beam in the first image of the object;
- in response to determining that the match exists between the facial signatures and the face ID data and the indication of the retro-reflected light beam, grant access to the electronic platform; and
- in response to determining that the match does not exist between the facial signatures and the face ID data or the indication of the retro-reflected light beam does not exist, deny access to the electronic platform.

9. The security check system of claim 8, wherein the indication of the retro-reflected light beam comprises presence of a bright spot in an eye in the first image of the object and absence of a bright spot in an eye in the second image of the object.

10. The security check system of claim 8, wherein the light source is configured to provide the incident light beam in an infrared wavelength range.

11. The security check system of claim 8, wherein the first camera comprises an imaging lens configured so that the first image of the object includes modulations.

12. The security check system of claim 11, wherein the modulations comprise distortions.

13. The security check system of claim 8, wherein the second camera comprises an imaging lens configured so that the second image of the object is an ideal image of the object.

14. A method of security check using face ID sensing for secure access to an electronic platform, the method performed by a security check system including a light source, a camera disposed adjacent to the light source, a computer memory, and a processing module, the method comprising:
- storing face ID data of an authorized person in the computer memory, the face ID data generated from one or more images of a live face of the authorized person acquired by the camera during a registration process;
- shining a light beam produced by the light source on an object;
- acquiring, using the camera, an image of the object while the light beam shines on the object;
- analyzing, using the processing module, the image of the object to extract facial signatures and to determine whether there exists an indication of a retro-reflection of the light beam incident on the object;
- comparing, using the processing module, the facial signatures to the face ID data to determine whether a match exists;
- in response to determining that the match does not exist between the facial signatures and the face ID data or the indication of the retro-reflection does not exist, denying access to the electronic platform; and
- in response to determining that the match exists between the facial signatures and the face ID data, and the indication of the retro-reflection exists, granting access to the electronic platform.

15. The method of claim 14, wherein the indication of the retro-reflection comprises a bright spot in an eye in the image of the object.

16. The method of claim 14, wherein indication of the retro-reflection comprises a bright spot in an eye in the image of the object.

17. The method of claim 14, wherein the light source is configured to provide the light beam in an infrared wavelength range.

18. The method of claim 14, wherein the camera comprises an imaging lens configured such that the image of the object include modulations.

19. The method of claim 18, wherein the modulations comprise distortions.

20. The method of claim 18, wherein the modulations include depth information of the object.

* * * * *